US007000080B2

(12) United States Patent
Van Doren et al.

(10) Patent No.: US 7,000,080 B2
(45) Date of Patent: Feb. 14, 2006

(54) CHANNEL-BASED LATE RACE RESOLUTION MECHANISM FOR A COMPUTER SYSTEM

(75) Inventors: Stephen R. Van Doren, Northborough, MA (US); Gregory E. Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 10/263,836

(22) Filed: Oct. 3, 2002

(65) Prior Publication Data

US 2004/0066758 A1   Apr. 8, 2004

(51) Int. Cl.
    G06F 12/00   (2006.01)
(52) U.S. Cl. .................. 711/143; 711/145; 711/158
(58) Field of Classification Search ................ 711/141, 711/143, 144, 145, 147, 158
    See application file for complete search history.

(56) References Cited

U.S. PATENT DOCUMENTS

| | | | |
|---|---|---|---|
| 4,847,804 A | 7/1989 | Shaffer et al. | |
| 5,222,224 A | 6/1993 | Flynn et al. | |
| 5,233,616 A | 8/1993 | Callander | |
| 5,297,269 A | 3/1994 | Donaldson et al. | |
| 5,303,362 A | 4/1994 | Butts, Jr. et al. | |
| 5,313,609 A | 5/1994 | Baylor et al. | |
| 5,490,261 A | 2/1996 | Bean et al. | |
| 5,530,933 A | 6/1996 | Frink et al. | |
| 5,537,575 A | 7/1996 | Foley et al. | |
| 5,551,005 A | 8/1996 | Sarangdhar et al. | |
| 5,579,504 A | 11/1996 | Callander et al. | |
| 5,608,893 A | 3/1997 | Slingwine et al. | |
| 5,737,757 A | 4/1998 | Hassoun et al. | |
| 5,761,731 A | 6/1998 | Van Doren et al. | |
| 5,905,998 A | 5/1999 | Ebrahim et al. | |
| 6,014,690 A | * 1/2000 | VanDoren et al. | .......... 709/215 |
| 6,055,605 A | 4/2000 | Sharma et al. | |
| 6,061,765 A | 5/2000 | Van Doren et al. | |
| 6,088,771 A | 7/2000 | Steely, Jr. et al. | |
| 6,094,686 A | 7/2000 | Sharma | |
| 6,101,420 A | 8/2000 | VanDoren et al. | |

(Continued)

FOREIGN PATENT DOCUMENTS

EP    0 817 074 A1    7/1998

OTHER PUBLICATIONS

Scales, D. and Gharachorloo, K., Design and Performance of the Shasta Distributed Shared Memory Protocol, XP-000755264, Jul. 7, 1997, pp. 245-252.

(Continued)

*Primary Examiner*—Matthew D. Anderson
*Assistant Examiner*—Jonathan Barton

(57) ABSTRACT

A channel-based mechanism resolves race conditions in a computer system between a first processor writing modified data back to memory and a second processor trying to obtain a copy of the modified data. In addition to a Q0 channel for carrying requests for data, a Q1 channel for carrying probes in response to Q0 requests, and a Q2 channel for carrying responses to Q0 requests, a new channel, the QWB channel, which has a higher priority than Q1 but lower than Q2, is also defined. When a forwarded Read command from the second processor results in a miss at the first processor's cache, because the requested memory block was written back to memory, a Loop command is issued to memory by the first processor on the QWB virtual channel. In response to the Loop command, memory sends the written back version of the memory block to the second processor.

20 Claims, 13 Drawing Sheets

U.S. PATENT DOCUMENTS

| | | | |
|---|---|---|---|
| 6,105,108 | A | 8/2000 | Steely, Jr. et al. |
| 6,108,737 | A | 8/2000 | Sharma et al. |
| 6,108,752 | A | 8/2000 | VanDoren et al. |
| 6,125,429 | A | 9/2000 | Goodwin et al. |
| 6,154,816 | A * | 11/2000 | Steely et al. ............... 711/150 |
| 6,202,126 | B1 | 3/2001 | Van Doren et al. |
| 6,249,520 | B1 | 6/2001 | Steely, Jr. et al. |
| 6,249,846 | B1 | 6/2001 | Van Doren et al. |
| 6,279,085 | B1 * | 8/2001 | Carpenter et al. .......... 711/143 |
| 6,944,719 | B1 * | 9/2005 | Rowlands et al. .......... 711/141 |

OTHER PUBLICATIONS

Scales, D., and Gharachorloo, K. and Thekkath, C., Shasta: A Low Overhead, Software-Only Approach for Supporting Fine-Grain Shared Memory, XP-002173083, Jan. 10, 1996, pp. 174-185.

Scales, D. and Gharachorloo, K., Towards Transparent and Efficient Software Distributed Shared Memory, XP-000771029, Dec. 1997, pp. 157-169.

Scales, D., Gharachorloo, K. and Aggarwal, A., Fine-Grain Software Distributed Shared Memory on SMP Clusters, WRL Research Report 97/3, Feb. 1997, pp. i and 1-28.

Gharachorloo, K., Lemoski, D., Laudon, J., GIbbons, P., Gupta, A. and Hennessey, J., Memory Consistency and Event Ordering in Scalable Shared-Memory Multiprocessors, (c) 1990 IEEE, pp. 15-26.

Jouppi, N., Improving Direct-Mapped Cache Performance by the Addition of a Small Fully-Associative Cache and Prefetch Buffers, (c) 1990 IEEE, pp. 364-373.

Agarwal, A., Simoni, R., Hennesy, J. and Horowitz, M., An Evaluation of Directory Schemes for Cache Coherence, (c)1988 IEEE, pp. 353-362.

Papapanaroos, M. and Patel. J., A Low-Overhead Coherence Solution for Multiprocessors with Private Cache Memories, (c) 1984 IEEE, pp. 284-290.

UltraSPARC Ultra Port Architecture (UPA): The New-Media System Architecture, http://www.sun.com/processors/whitepapers/wp95-023.html, Copyright 1994-2002 Sun Microsystems, pp. 1-4.

Porting OpenVMS Applications to Intel Itanium Architecture, Compaq Conputer Corporation, Apr. 2002, pp. 1-17.

Adve, S., Hill, M., Miller, B. and Nester, R., Detecting Data Races on Weak Memory Systems, (c) 1991 ACM, pp. 234-243.

Gharachorloo, K., Sharma, M., Steely, S. and Van Doren, S., Architecture and Design of AlphaServer GS320, Nov. 2000, pp. 1-12.

IEEE Standard for Scalable Coherent Interface (SCI), (c) 1993 IEEE, pp. Table of Contents, 30-34 and 141-188.

* cited by examiner

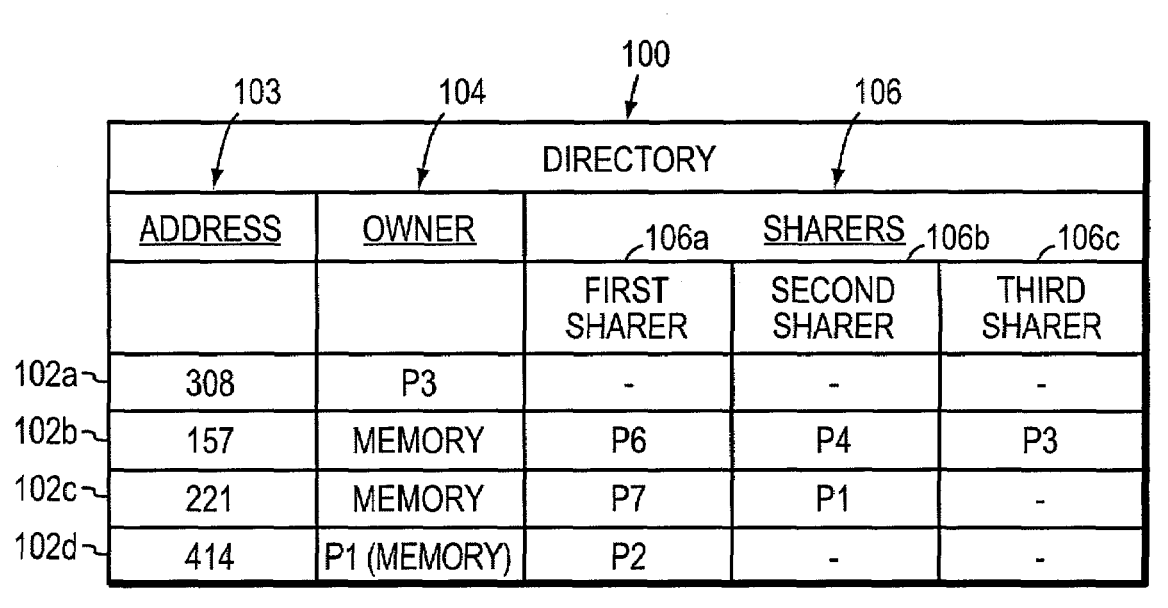

| | DIRECTORY | | | |
|---|---|---|---|---|
| ADDRESS | OWNER | SHARERS | | |
| | | FIRST SHARER | SECOND SHARER | THIRD SHARER |
| 308 | P3 | - | - | - |
| 157 | MEMORY | P6 | P4 | P3 |
| 221 | MEMORY | P7 | P1 | - |
| 414 | P1 (MEMORY) | P2 | - | - |

FIG. 1
(PRIOR ART)

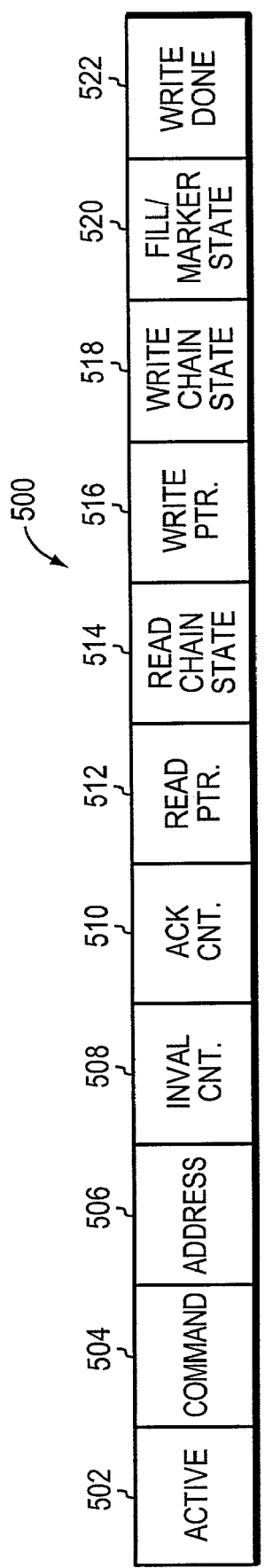
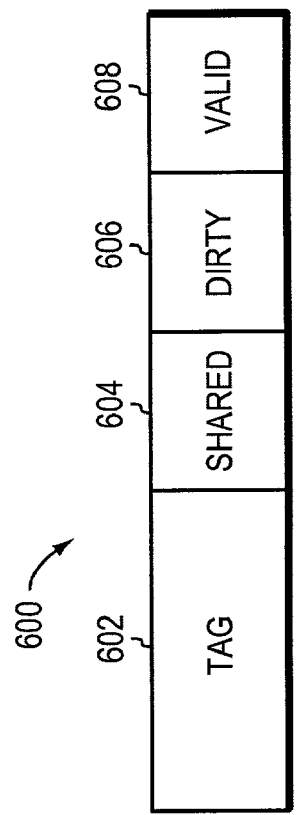
FIG. 5
FIG. 6

| | DIRECTORY 420 | | | | | | |
|---|---|---|---|---|---|---|---|
| | MAIN DIRECTORY REGION 702 | | | | | WRITE-BACK DIRECTORY REGION 704 | |
| | | SHARER LIST 716 | | UNUSED 718 | ECC 720 | WRITER 722 | UNUSED 724 | ECC 726 |
| | OWNER/ SHARER 714 | SHARER 0 716a | SHARER 1 716b (SHARER VECTOR) 716c | | | | | |
| 706a | MEMORY | 0 | 0 | 0 | - | MEMORY | 0 | - |
| 706b | MEMORY | P0 | 0 | 0 | - | MEMORY | 0 | - |
| 706c | P0 | 0 | 0 | 0 | - | MEMORY | 0 | - |
| 706d | P0 | P1 | 0 | 0 | - | MEMORY | 0 | - |
| 706e | P2 | 0 | 0 | 0 | - | MEMORY | 0 | - |
| 706f | P2 | P3 | 0 | 0 | - | P2 | 0 | - |
| 706g | P2 | 0 | 0 | 0 | - | P2 | 0 | - |
| 706h | P2 | P12 | 0 | 0 | - | 0 | 0 | - |
| 707 | P9 | 0 | 0 | 0 | - | MEMORY | 0 | - |
| 708 | P6 | 0100011100000000 | 0 | 0 | - | MEMORY | 0 | - |
| 709 | P10 | 0 | 0 | 0 | - | P12 | 0 | - |
| 710 | P8 | 0000010000010010 | 0 | 0 | - | MEMORY | 0 | - |

CHANNEL-BASED LATE RACE RESOLUTION MECHANISM FOR A COMPUTER SYSTEM

CROSS-REFERENCE TO RELATED APPLICATION

This application is related to the following co-pending, commonly owned U.S. patent applications:

U.S. patent application Ser. No. 10/263,739 entitled DIRECTORY STRUCTURE PERMITTING EFFICIENT WRITE-BACKS IN A SHARED MEMORY COMPUTER SYSTEM, filed Oct. 3, 2002.

U.S. patent application Ser. No. 10/263,743 entitled RETRY-BASED LATE RACE RESOLUTION MECHANISM FOR A COMPUTER SYSTEM, filed Oct. 3, 2002.

BACKGROUND OF THE INVENTION

1. Field of the Invention

The present invention relates to shared memory computer architectures and, more specifically, to cache coherency protocols for use in shared memory computer systems.

2. Background Information

A computer system typically comprises one or more processors linked to a main memory by a bus or other interconnect. In most computer systems, main memory organizes the instructions and data being stored into units typically referred to as "blocks" each of which is separately addressable and may be of a fixed size. Instructions and data are typically moved about the computer system in terms of one or more blocks.

Ordinarily, a processor will retrieve data, e.g., one or more blocks, from main memory, perform some operation on it, and eventually return the results back to main memory. Retrieving data from main memory and providing it to a processor can take significant time especially in terms of the high operating speeds of today's processors. To reduce such latencies as well as to reduce the number of times a processor must access main memory, modem processors and/or processor chipsets include one or more cache memories or caches. A cache is a small, fast memory module that is placed in close proximity to the processor. Many caches are static random access memories (SRAMs), which are faster, but more expensive, than dynamic random access memories (DRAMs), which are often used for main memory. The cache is used to store information, e.g., data or instructions, which the processor is currently using or is likely to use in the near future. There are two basic types of caches: "write-through" caches and "write-back" caches.

With a write-through cache, whenever a processor modifies or updates a piece of data in the processor's cache, main memory's copy of that data is automatically updated. This is accomplished by having the processor write the data back to memory whenever the data is modified or updated. A write-back cache, in contrast, does not automatically send modified or updated data to main memory. Instead, the updated data remains in the cache until some more convenient time, e.g., when the processor is idle, at which point the modified data is written back to memory. The utilization of write-back caches typically improves system performance. In some systems, a write-back or victim buffer is provided in addition to the cache. "Victim data" refers to modified data that is being removed from the processor's cache in order to make room for new data received at the processor. Typically, the data selected for removal from the cache is data the processor is no longer using. The victim buffer stores this modified data which is waiting to be written back to main memory. The use of a victim buffer frees up space in the cache for other data. Modified data in the victim buffer is eventually "victimized", i.e., written back to main memory, at some convenient time.

Although the implementation of write-back or victim buffers have increased the performance of computer systems, there are some drawbacks. For example, the addition of a victim buffer requires additional logic and storage or memory space at the processor chipset increasing cost, complexity and size of the processor chipset.

Symmetrical Multiprocessor (SMP) Systems

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

Cache Coherency

Because more than one processor of the SMP system may request a copy of the same memory block from main memory, cache coherency protocols have been developed to ensure that no processor relies on a memory block that has become stale, typically due to a modification or update performed to the block by some other processor. Many cache coherency protocols associate a state with each cache line. A given memory block, for example, may be in a shared state in which copies of the block may be present in the caches associated with multiple processors. When a memory block is in the shared state, a processor may read from, but not write to, the respective block. To support write operations, a memory block may be in an exclusive state. In this case, the block is owned by a single processor which may write to the cache line. When the processor updates or modifies the block, its copy becomes the most up-to-date version, while corresponding copies of the block at main memory and/or other processor caches become stale.

When a processor wishes to obtain exclusive ownership over a memory block that is currently in the shared state (i.e., copies of the block are present in the caches of other processors) invalidate requests are typically issued to those other processors. When an invalidate request is received by a given processor, its cache is searched for the specified memory block. If the block is found, it is transitioned to an invalid state. Many caches assign or associate a valid bit with each memory block or cache line stored in the cache. If the bit is asserted, then the cache line is considered to be valid and may be accessed and utilized by the processor. When a memory block is initially received from main memory, the valid bit is asserted and the memory block is stored in the cache. When an invalidate request is received, the valid bit of the respective cache line is de-asserted, thereby indicating that the cache line is no longer valid.

There are two classes of cache coherency protocols: snooping and directory based. With snooping, the caches monitor or snoop all transactions traversing the shared memory bus, looking for transactions that reference a memory block stored at the cache. If such a transaction is detected, the cache updates the status information for its copy of the memory block based on the snoop transaction. In this way, every cache that has a copy of a given memory block also has a copy of the status information of that block. With a directory based protocol, the state of each block is kept in a single, centralized location in the system, called a directory. Status information is not maintained in the individual caches.

FIG. 1 is a highly schematic illustration of a prior art directory 100. Directory 100 has a plurality of entries 102a–d each of which corresponds to a respective memory block. The directory 100 is organized, moreover, such that each entry 102a–d has a plurality of fields or cells for storing state and/or status information for the respective block. In particular, the directory 100 has an address column 103 that stores the address of the memory block, an owner column 104 that stores the identity of the entity, e.g., a processor or main memory itself, that is considered to be the owner of the memory block, and a sharer column 106 that stores the identity of those processors or other system entities that have a shared copy of the block.

The sharer column 106 may have a plurality of sub-columns 106a–c, each of which may contain the identity of a particular processor that has a shared copy of the respective memory block. If a request for shared access to a memory block is received from a first processor, P1, main memory examines the directory entry, e.g., entry 102c, for the block to determine its owner. As memory is itself the owner of the block, memory sends its copy of the block to P1 and enters P1's identifier (ID) into one of the sharer fields, e.g. field 106b, of the respective directory entry, e.g., entry 102c, thereby noting that P1 has a shared copy of the block. Since P1 only requested shared access to the memory block, the contents of the entry's owner field 104 are not modified.

If P1 issues a request for exclusive or write access to some other memory block, e.g., the block corresponding to entry 102d, main memory again examines the contents of entry 102d. Suppose that, at the time the request is received, the owner field reflected that memory was the owner of the memory block as shown in parentheses. In this case, memory sends the block to P1, and replaces the contents of the owner field 104 with P1's ID to reflect that P1, rather than memory, is now the owner of the memory block. P1 may then modify or update the memory block. If a request from a second processor, P2, is subsequently received for a shared copy of this memory block, main memory examines entry 102d of the directory 100 and determines that P1 is the owner of the memory block. Because its copy of the block, i.e., the copy stored at main memory, may be stale, memory does not forward its copy to P2. Instead, memory may be configured to forward the request to P1 and add P2's ID to one of the sharer fields, e.g., field 106a. In response to the forwarded request, P1 may then supply P2 with a copy of the modified memory block from P1's cache. Alternatively, main memory may be configured to force P1 to relinquish ownership of the memory block and return the modified version to memory so that memory can send a copy of the up-to-date version to P2.

It has been recognized that a computer system's cache coherency protocol is a key factor in the system's ultimate performance. Poorly designed cache coherency protocols can result in latencies, bottlenecks, other inefficiencies and/or higher complexity, each of which may reduce performance and/or increase cost. Bottlenecks, for example, often arise in high occupancy controllers, such as directory controllers. "Occupancy" is a term of art and refers to the amount of time a controller is unavailable, e.g., for the servicing of requests, following receipt of an earlier request.

In some cache coherency protocols, when a directory controller receives a request corresponding to a memory block, it thereafter becomes unavailable to service other requests for that memory block until certain acknowledgements to the earlier request are received back at the directory controller. The stalling of requests or references until the directory controller is once again available may degrade system performance. Thus, efforts have been made to design low occupancy cache coherency protocols, which allow multiple requests to the same memory block to be executing substantially simultaneously within the computer system.

Low occupancy cache coherency protocols can nonetheless result in the creation of coherency races that, in turn, can cause system deadlock and/or starvation. Accordingly, a need exists for a low occupancy cache coherency protocol that avoids deadlock and/or starvation in the face of coherency races.

SUMMARY OF THE INVENTION

Briefly, the invention relates to a mechanism for resolving late races involving write-backs to memory by creating a new virtual channel and a new message to be transmitted in the new virtual channel. The channel-based late race resolution mechanism of the present invention is designed for use in a shared memory computer system, such as a symmetrical multiprocessor (SMP) computer system. The SMP system may comprise one or more nodes each having a plurality of processors and a plurality of shared memory subsystems coupled together by an interconnect fabric. The memory subsystems are configured to store data in terms of memory blocks, and each processor preferably has a cache for storing copies of memory blocks being used by the processor. Each processor further includes a miss address file (MAF) that keeps track of requests issued to a memory subsystem for a memory block not currently stored in the processor's cache. Each memory subsystem, moreover, has a memory controller and a directory for maintaining owner and sharer status information for the memory blocks for which the memory subsystem is responsible, i.e., those memory blocks for which the memory subsystem is the "home" memory.

In the illustrative embodiment, the directory has a plurality of entries each of which is assigned to a respective memory block, and is organized into a main directory region and a write-back directory region. In the main directory region, each entry has a single owner/sharer field and a sharer list. The owner/sharer field indicates which entity, e.g., processor, is considered to be the owner of the block. The sharer list indicates which entities, e.g., processors, have a copy of the memory block in their caches. In the write-back directory region, each entry has a writer field identifying the last owner to have written the memory block back to the memory subsystem.

The processors and memory subsystems of the SMP system communicate with each other by exchanging command packets that are carried by the SMP system within a plurality of virtual channels. The virtual channels are utilized to avoid deadlock and prevent starvation. They include a Q0 virtual channel for carrying memory reference requests, a Q1 virtual channel, which has a higher priority than Q0, for carrying probes in response to Q1 requests, and a Q2 virtual channel, which has a higher priority than Q1, for carrying responses to Q0 requests. In accordance with the present invention, there is also a new virtual channel, the QWB virtual channel, which has a higher priority than Q1 but lower than Q2. In the illustrative embodiment, each of the virtual channels is an ordered communication channel.

In operation, when a first processor requests write access over a given memory block, the owner/sharer field of the respective directory entry is loaded with an identifier (ID) assigned to the first processor, thereby reflecting that the first processor is the owner of the memory block and has the most up-to-date copy. When the first processor completes its modification of the memory block, it issues a Write_Back (WB) command on the new QWB virtual channel to the memory subsystem. Here, the writer field of the respective directory entry is loaded with the first processor's ID, the owner/sharer field is left unchanged, and the modified data is written back to memory. Preferably, the processors do not have victim caches and thus do not buffer a copy of modified data pending completion of a WB command.

Suppose a Read command is issued for the memory block by a second processor before the WB command from the first processor is received at the directory. As the first processor is still considered to be the owner of the memory block, a probe, such as a Forwarded_Read (FRead) command, is preferably sent to the first processor on the Q1 virtual channel directing it to service the Read command out of the first processor's cache. At the first processor, however, a miss will occur as the first processor sent the modified data back to main memory in the WB command. This condition is known as a late race condition.

To resolve the late race, the first processor issues a new command, called a Loop_Forwarded_Read (LFRead) command, to main memory also on the QWB virtual channel. Because the QWB virtual channel is an ordered channel, the WB command arrives at the home memory before the LFRead. WB command is processed by the memory subsystem as described above. That is, the writer field is updated with the first processor's ID and the modified data is written back to memory. When the LFRead is received, the memory subsystem compares the directory entry's writer field with the ID of the entity that sourced the LFRead command. As the two values match, the memory subsystem responds by issuing a Fill command to the second processor on the Q2 virtual channel that includes a copy of the requested memory block from memory. The second processor thus receives the requested data, thereby completing the memory reference operation. Notably, the LFRead command does not cause any change to the directory state.

In an alternative embodiment, the channels are unordered and another new channel, the Q3 virtual channel is added. The Q3 virtual channel has a higher priority than the Q2 virtual channel. In this embodiment, WB commands are issued on the Q2 virtual channel as opposed to the QWB virtual channel while the loop commands are still issued on the QWB virtual channel. The Q3 virtual channel is used for WB_Acknowledgments (WBAcks) from the memory subsystems to the processors confirming receipt of WB commands from the processors.

BRIEF DESCRIPTION OF THE DRAWINGS

The invention description below refers to the accompanying drawings, of which:

FIG. 1, previously discussed, is a highly schematic diagram of a conventional directory;

FIG. 5 is a highly schematic block diagram of a miss address file (MAF) entry;

FIG. 6 is a highly schematic block diagram of a cache tag entry;

FIG. 7 is a highly schematic block diagram of the directory of the present invention;

DETAILED DESCRIPTION OF AN ILLUSTRATIVE EMBODIMENT

Figure 2:
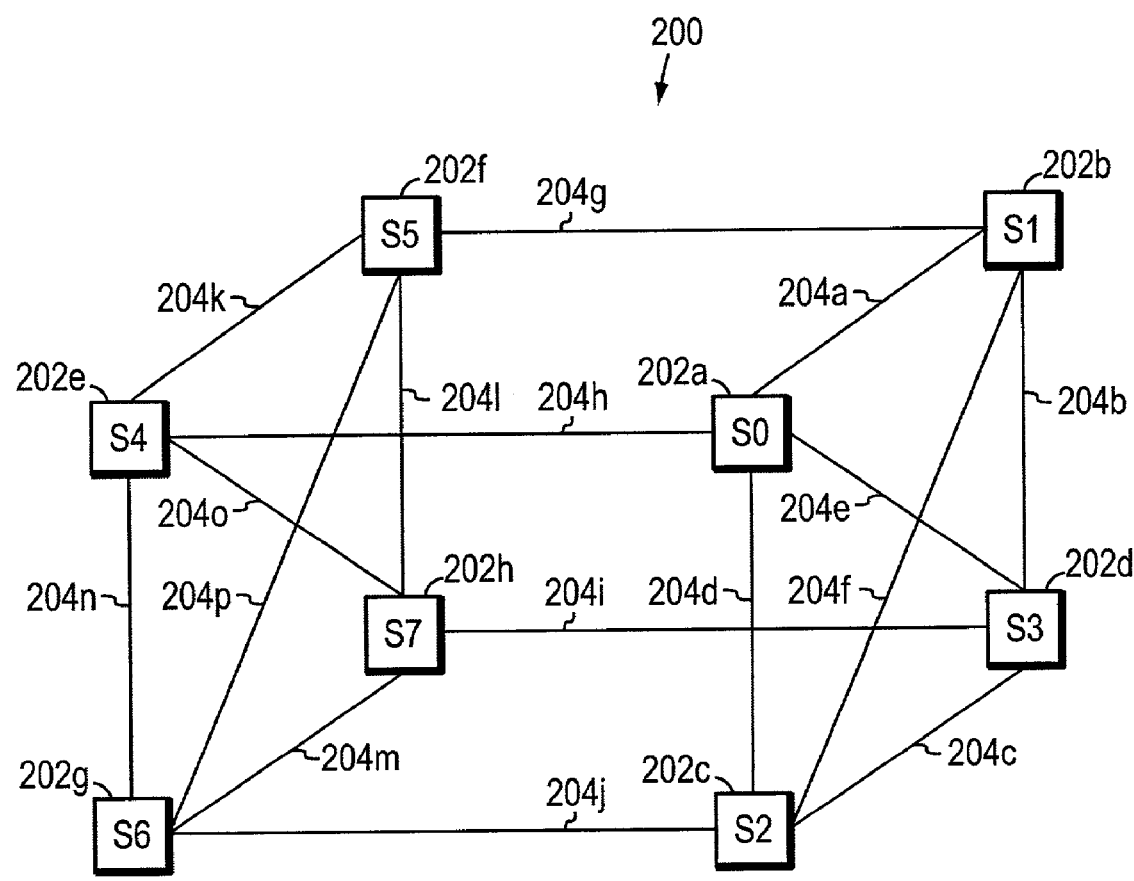
FIG. 2 is a highly schematic functional block diagram of a multi-processor node.

FIG. 2 is a highly schematic illustration of a preferred multiprocessor node 200 for use with the present invention. The node 200 comprises a plurality of, e.g., eight, sockets, S0–S7, which are designated by reference numerals 202a–h. The eight sockets 202a–h are logically located at the corners of a cube, and are interconnected by a plurality of inter-processor links 204a–p. Thus, each socket can communicate with any other socket of the node 200. In the illustrative embodiment, sockets forming two opposing sides of the node 200 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 204g–j. As described herein, each socket includes one or more processors and has or is coupled to two main memory subsystems.

Figure 3:
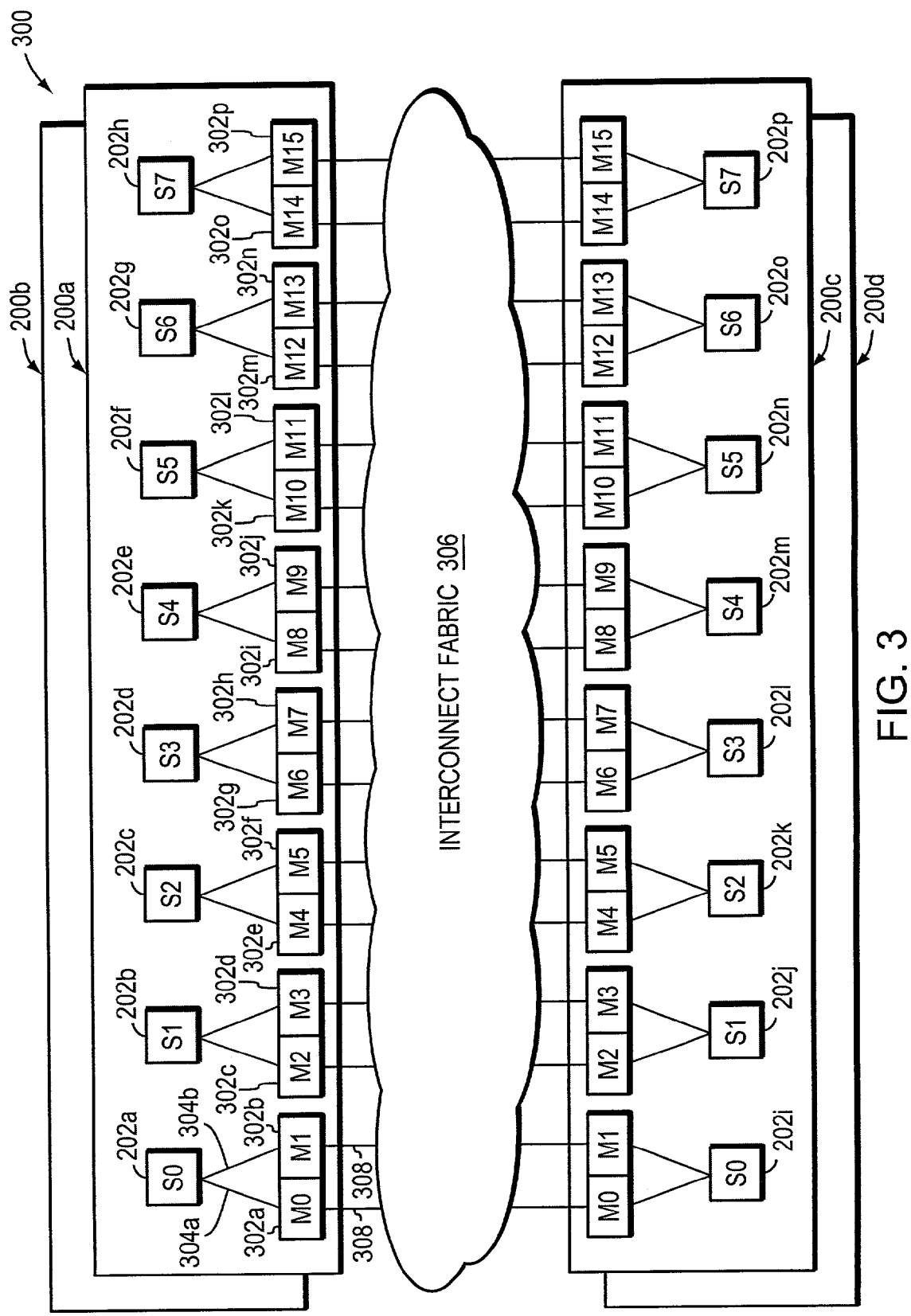
FIG. 3 is a highly schematic functional block diagram of a symmetrical multiprocessor (SMP) computer system formed from a plurality of multi-processor nodes.

FIG. 3 is a highly schematic illustration of a symmetrical multiprocessing (SMP) computer system 300 from a plurality of nodes. In particular system 300 comprises four nodes 200a–d, each of which corresponds to node 200 (FIG. 2). The inter-processor links have been omitted for clarity. As described above, each node, such as nodes 200a and 200c, has eight sockets, such as sockets 202a–h and 202i–p, respectively. Each node also includes a plurality of main memory subsystems (M0–M15). In the preferred embodiment, each node has sixteen memory subsystems, two for each socket. The sixteen memory subsystems M0–M15 of node 200a are designated by reference numerals 302a–p. Each socket is coupled to a pair of memory subsystems by a corresponding pair of processor/memory links. Socket 202a, for example, is coupled to memory subsystems 302a and 302b by processor/memory links 304a and 304b, respectively.

The four nodes 200a–d, moreover, are fully interconnected with each other through an interconnect fabric 306. Specifically each memory subsystem, such as subsystems 302a and 302b, are connected to the interconnect fabric 306 by fabric links 308. In the preferred embodiment, each memory subsystem at a given node is coupled to its corresponding memory subsystem at the other three nodes. That is, memory subsystem M0 at node 200a is coupled by four fabric links to the M0 memory subsystem at the three other nodes 202b–d, memory subsystem M1 at node 200a is coupled by four fabric links to the M1 memory subsystem at the other three nodes 202b–d, and so on.

Figure 4:
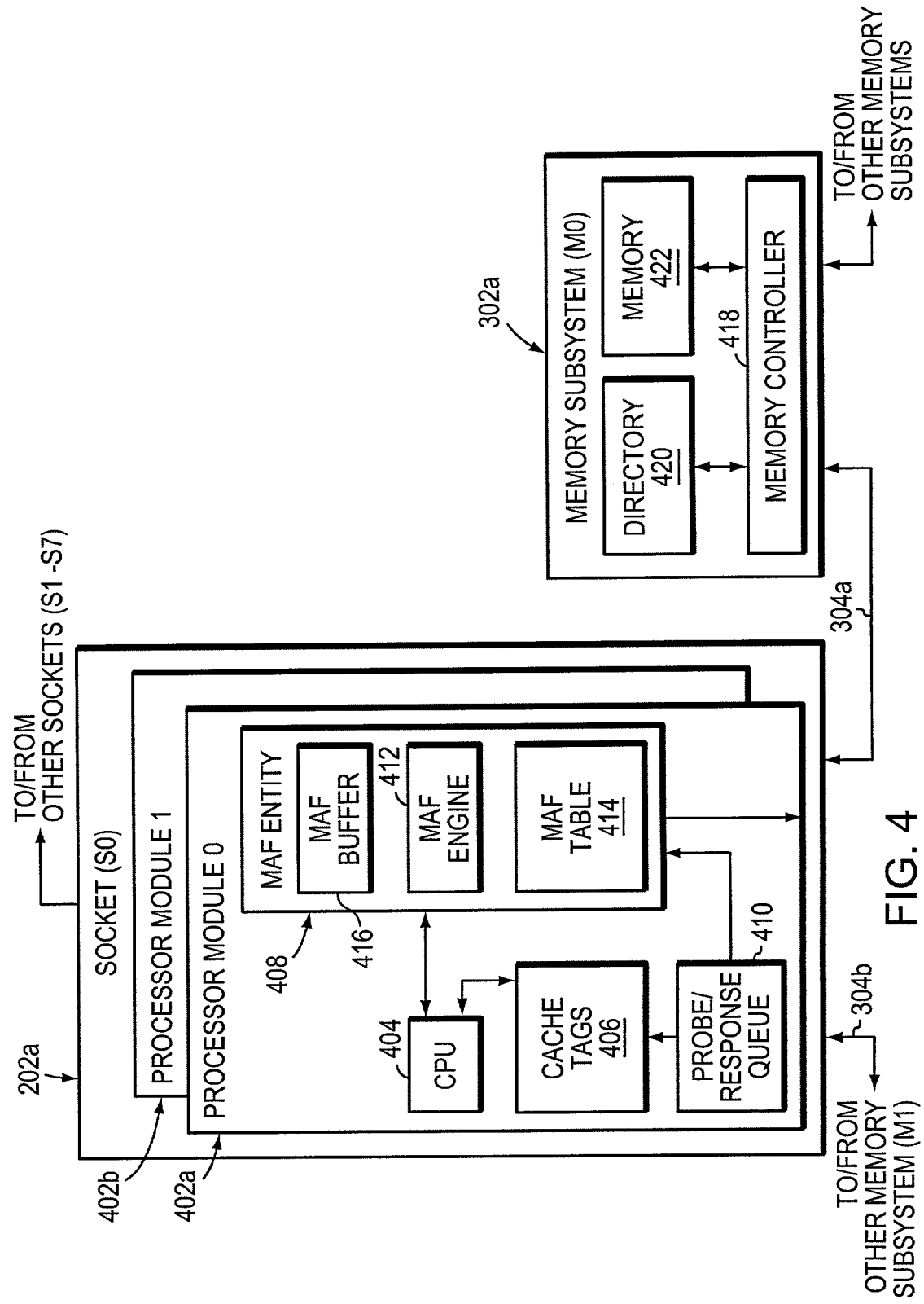
FIG. 4 is a highly schematic block diagram of a processor socket and memory subsystem of the SMP computer system of FIG. 3.

FIG. 4 is a highly schematic illustration of socket (S0) 202a, and one of its associated memory subsystems (M0) 302a. Socket 202a includes two processor modules 402a and 402b. Each processor module, such as module 402a, has a processor or central processing unit (CPU) 404, a cache tags storage device 406, a miss address file (MAF) entity 408 and a probe/response queue 410. The CPU 404 includes one or more processor caches (not shown) that are in close proximity to the CPU for storing data that the CPU 404 is currently using or is likely to use in the near future. Information regarding the status of the data stored in the processor cache(s), such as the address and validity of that data, is maintained in the cache tags storage device 406. The MAF entity 408, which keeps track of commands, such as memory reference requests, issued to the system, has a MAF engine 412 and a MAF table 414. MAF entity 408 may also include one or more buffers, such as MAF buffer 416.

Processor module 402b similarly includes a CPU, a cache tags storage device, a MAF entity and a probe/response queue. Socket (S0) 202a is coupled to the other sockets (S1–S7) of node 200a by inter-socket links and to memory subsystems (M0) 302a and (M1) 302b (FIG. 3) by processor/memory links 304a and 304b, respectively.

It should be understood that each processor module 402 may also include other components, such as a write back or victim buffer, a register file, a translation look-aside buffer (TLB), load/store (L/S) queues, etc.

The memory subsystem (M0) 302a has a memory controller 418, a directory 420 and one or more memory modules or banks, such as memory unit 422. Memory unit 422 may be and/or may include one or more conventional or commercially available dynamic random access memory (DRAM), synchronous DRAM (SDRAM), double data rate SDRAM (DDR-SDRAM) or Rambus DRAM (RDRAM) memory devices.

The memory subsystems of nodes 200a–d combine to form the main memory of the SMP system 300 some or all of which may be shared among the processors. Each socket 202, moreover, includes a portion of main memory by virtue of its respective memory subsystems 302. Data stored at the memories 422 of each subsystem 302, moreover, is organized into separately addressable memory, blocks that are equivalent in size to the amount of data stored in a processor cache line. The memory blocks or cache lines are of uniform, fixed size, and represent the smallest unit of data that can be moved around the SMP system 300. In the preferred embodiment, each cache line contains 128-bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the SMP system 300, has a pre-determined home memory subsystem that does not change. Each directory, moreover, maintains status information for the cache lines for which its memory subsystem is the home memory. In other words, rather than having a single, centralized directory, the "directory" for the SMP system 300 is distributed across all of the memory subsystems.

CPU 404 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

The processors 404 and memory subsystems 302 interact with each other by sending "command packets" or simply "commands" to each other. Commands may be classified generally into three types: Requests, Probes and Responses. Requests are commands that are issued by a processor when, as a result of executing a load or store operation, it must obtain a copy of data. Requests are also used to gain exclusive ownership or write access to a piece of data, e.g., a memory block. Requests include Read commands, Read_Modify (ReadMod) commands, Change_to_Dirty (CTD) commands, and Write_Back (WB) commands, among others. Probes are commands issued to one or more processors requesting data and/or cache tag status updates. Probe commands include Forwarded_Read (FRead) commands, Forwarded_Read_Modify (FReadMod) commands, and Invalidate (Inval) commands, among others. Responses are commands which carry requested data to a processor or acknowledge some request. For Read and ReadMod commands, the responses are Fill and Fill_Modify (FillMod) commands, respectively. For CTD commands, the responses are CTD_Success or CTD_Failure commands. For WB commands, the response may be a WB_Acknowledgement command.

The MAF table 414 is organized at least logically as a table or array having a plurality of rows and columns whose intersections define cells for storing information. FIG. 5 is a highly schematic block diagram of an exemplary row or entry 500 of MAF table 414 (FIG. 4). Entry 500 has a plurality of fields including a 1-bit active field or flag 502, which indicates whether the respective entry 500 is active or inactive, i.e., whether the outstanding request represented by entry 500 is complete or not. A request that is not yet complete is considered active. Entry 500 further includes a command field 504 that specifies the particular command that is outstanding, and an address field 506 that specifies the memory address corresponding to the command. Entry 500 additionally includes an invalid count (Inval Cnt.) field 508, an acknowledgement count (Ack Cnt.) field 510, a read pointer (ptr.) field 512, a read chain field 514, a write pointer field 516, a write chain field 518, a fill/marker state field 520 and a write done field 522.

MAF engine 412, among other things, operates one or more state machines for each entry of the MAF table 414. Specifically, the read chain field 514, the write chain field 518 and the fill/marker field 520 each store a current state associated with the entry. In the illustrative embodiment, a MAF entry transitions between two fill/marker states: idle and active, and the current fill/marker state is recorded at field 520.

The cache tags storage device 406 (FIG. 4) is also organized at least logically as a table or array having a plurality of rows and columns whose intersections define cells for storing information. FIG. 6 is a highly schematic block diagram of an exemplary row or entry 600 of the cache tags storage device 406. As mentioned above, each entry of the cache tags storage device 406, including entry 600, corresponds to a particular cache line stored at the processor's cache(s). Cache tag entry 600 includes a tag field 602 that specifies the memory address of the respective cache line, and a series of status flags or fields, including a shared flag 604, a dirty flag 606 and a valid flag 608.

In the illustrative embodiment, the processors and memory subsystems of the SMP 300 system cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownership-based" implies there is always an identifiable owner for a cache line, whether it is memory or one of the processors of the SMP system 300. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Directory 420 is similarly organized at least logically as a table or array having a plurality of rows and columns whose intersections define cells for storing information. FIG. 7 is a highly schematic block diagram of directory 420. In accordance with the present invention, directory 420 is organized into two regions or areas, a main directory region 702 and a write-back directory region 704. A plurality of rows 706–710 span both regions 702 and 704 of the directory 420. Several versions of row 706, which are described below, are shown. Within each region 702 and 704, a plurality of columns are defined for specifying the type of information stored in the directory's entries. The main directory region 702, for example, has an owner/sharer column 714 for storing the identifier (ID) assigned to the entity that owns the cache line, and a sharer list column 716 for indicating which entities, if any, have a shared copy of the cache line.

The sharer list column 716 is preferably configured to operate in one of two different modes. In a first mode, sharer list column 716 is organized into two sharer columns 716a and 716b each of which can store the identifier (ID) assigned to a single entity, such as a processor, of the SMP system 300 that has a shared copy of the respective cache line. If a third entity is to be added as a sharer, the sharer list column 716 converts from two sharer columns 716a and 716b to a single coarse sharer vector column 716c. Each bit of the sharer vector column 716c corresponds to and thus identifies a set of one or more sockets 202 of system 300. If a bit is asserted, then at least one processor located within the set of sockets associated with the asserted bit has a copy of the respective cache line. Entries 707 and 709 illustrate the first mode, and entries 708 and 710 illustrate the second mode. Main region 702 further includes an unused column 718 and an error correction code (ECC) column 720 for storing an ECC value calculated for the data in fields 714–718.

The write-back region 704 has a writer column 722, an unused column 724 and an ECC column 726. As explained herein, the contents of the owner/sharer column 714 of the main region 702 together with the contents of the writer column 722 of the write-back region 704 determine who owns the respective cache line and thus where the most up-to-date version is located within the SMP system 300. The ECC column 726 stores an ECC value calculated for the data in fields 722 and 724.

The unused fields 718 and 724 are provided in order to support modifications to the protocol and/or increases in the size of the address or other fields. It should be understood that one or more bits of unused column 714 may be used to signify whether the corresponding entry's sharer list 716 is in individual sharer mode, i.e., fields 716a and 716b, or in coarse sharer vector mode, i.e., sharer vector field 716c.

In the preferred embodiment, directory 420 is actually located within the memory unit 422 itself along with the memory blocks, and is not a separate memory component. That is, each memory address indexes to an area of the memory device 422 that is preferably divided into three regions. The first region corresponds to the main directory region for the block specified by the memory address. The second region corresponds to the write-back region for the memory block, and the third region corresponds to the data contents of the memory block.

In the illustrative embodiment, the owner/sharer field 714 is 10-bits, the sharer list field 716 is 16-bits, thereby supporting either two 8-bit sharer-IDs or one 16-bit coarse sharer vector, and the unused and ECC fields 718 and 720 are each 7-bits. The main directory region 702 of a memory area is thus 5-bytes. For the write-back region 704, the writer field is 9-bits, the unused field is 1-bit and the ECC field is 6-bits, thereby making the write-back region 2-bytes. The third region includes the cache line, which may be 128-bytes, and a 9-byte ECC field (not shown) for a total of 137-bytes. The ECC field associated with the cache line contains an ECC value computed for the cache line itself.

Accordingly, for each cache line, the memory area comprises 144-bytes of information in total.

As mentioned above, each CPU 404 of the SMP system 300 may access portions of memory stored at the two memory subsystems 302 coupled to its socket, i.e., a "local" memory access, or at the memory subsystems coupled to any other socket of the SMP system 300, i.e., a "remote" memory access. Because the latency of a local memory access will differ from the latency of a remote memory access, the SMP system 500 is said to have a non-uniform memory access (NUMA) architecture. Further, since the system 300 provides coherent caches, the system is often called a cache-coherent NUMA (CC-NUMA) system. In the illustrative embodiment of the invention, the SMP system 300 is preferably referred to as a distributed shared memory system, although it may also be considered equivalent to the above classes of systems.

Virtual Channels

Memory reference operations, such as reads, from a processor are preferably executed by the SMP system 300 through a series of steps where each step involves the exchange of a particular command packet or more simply command among the processors and shared memory subsystems. The cache coherency protocol of the present invention avoids deadlock through the creation of a plurality of channels. Preferably, the channels share physical resources and are thus "virtual" channels. Each virtual channel, moreover, is assigned a specific priority relative to the other virtual channels so that, by appropriately assigning the different types of commands to different virtual channels, the SMP system 300 can also eliminate flow dependence. In general, commands corresponding to later steps in the series for a given operation are assigned to higher priority virtual channels than the commands corresponding to earlier steps.

In accordance with the present invention, the SMP system 300 maps commands into at least four (4) different virtual channels. A Q0 channel carries processor command packet requests for memory space read and write transactions. A Q1 channel accommodates probe command packets to Q0 requests and has a higher priority than Q0. A new virtual channel, which is referred to as the QWB virtual channel, carries write-backs and other commands and has a higher priority than Q1. A Q2 channel carries response command packets to Q0 requests and has the highest priority. Each of the virtual channels, moreover, is implemented as an ordered virtual channel. That is, the physical components that implement the virtual channels are configured such that the commands in any given virtual channel are received in the same order in which they are sent.

A suitable mechanism for implementing ordered virtual channels in a large SMP system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The virtual channels, moreover, can be configured to carry other types of command packets. The Q0 virtual channel, for example, may also accommodate processor command request packets for programmed input/output (PIO) read and write transactions, including control status register (CSR) transactions, to input/output (I/O) address space. Alternatively, a QIO virtual channel having a priority below the Q0 virtual channel can be defined to accommodate PIO read and write transactions.

Operation of the Distributed Directory

Each memory subsystem preferably includes a built-in, self test (BIST) engine (not shown) that is used during initialization of the subsystem. The BIST engine initializes the contents of the memory device 422, including the directory contents and ECC values, by setting them to predetermined values as one of the final steps of the self test. It should be understood that firmware, rather than or in addition to a BIST engine, may be used for initialization purposes.

As data is brought into the SMP system 300, it is loaded into the memory devices 422 of the memory subsystems 302 in units of memory blocks or cache lines. As each memory block is stored at a memory subsystem 302, the memory controller 418 computes a first error correction code (ECC) value for the block which is stored along with the cache line as described above. Data may be brought into the memory subsystems 302 from any number of sources, such as floppy disk drives, hard disk drives, tape drives, optical or magneto-optical drives, scanners, sound cards, etc. The memory controller 418 also loads the owner/sharer field 714 in the main region 702 and the writer field 722 in the write-back region 704 with the same value, namely, the identifier (ID) assigned to the home memory system. The remaining fields of each entry are preferably de-asserted and/or set to null, e.g., to zero. The memory controller 418 also computes a second ECC value for the information in the main directory region 702, and a third ECC value for the information in the write-back region 704. The second ECC value is stored in ECC field 720 while the third ECC value is stored in ECC field 726. Entry 706a illustrates how a directory entry would appear upon initialization of the memory subsystem.

Read Command

Suppose a processor, e.g., processor P0, of the SMP system 300 wishes to read a cache line that is not present in its cache. Processor P0 preferably issues a Read command on the Q0 virtual channel specifying the address of the desired cache line. Processor P0 also directs MAF entity 416 to create an entry in the MAF table 414 for this request. MAF entity 416 asserts the active flag 502, loads the command field 504 with an operation code (opcode) indicating that the outstanding request is a Read command and enters the address of the cache line in the address field 506. MAF engine 412 transitions the Fill/Marker state associated with the entry and reflected in field 520 from the idle state to the active state. The remaining fields of the MAF table entry 500 may be de-asserted. The SMP system 300 routes the Read command from processor P0 to the home memory subsystem for the specified cache line, e.g., subsystem 302a.

At memory subsystem 302a, the memory controller 418 accesses the area of memory device 422 specified by the address contained in the Read command, and retrieves the directory entry, e.g., entry 706a, for the cache line. The memory controller 418 first examines the information stored in the owner/sharer field 714 and the writer field 722 of the identified entry 706a. Because the contents of both the owner/sharer field 714 from the main region 702, and the writer field 722 from the write-back region 704 are the same, i.e., memory, the memory controller 418 concludes that it is the owner of the cache line, and that the version stored at its memory device 422 is the most up-to-date. Accordingly, the memory controller 418 responds to the Read command by sending processor P0 a copy of the cache line from memory device 422.

Specifically, the memory controller 418 issues a Fill command on the Q2 virtual channel that includes the address and data of the requested cache line. The memory controller 418 also adds P0's identifier (ID) to the list of sharers maintained in the sharer column 716. Assuming P0 is the first entity to request a shared copy of the cache line, memory controller 418 enters P0's ID into sharer field 716a. As P0 has only requested a shared copy of the cache line, the memory controller 418 does not modify the contents of the owner/sharer field 712. The memory controller 418 also does not-modify the contents of the writer field 722. Entry 706b (FIG. 7) illustrates how entry 706a would appear following the updates performed by the memory controller 418 in response to the Read command from P0.

It should be understood that, when a memory block is read out of a memory device 422, the memory controller 418 preferably checks parity information, e.g., a parity bit, to determine whether the retrieved data has been corrupted. If so, the memory controller 418 utilizes the previously computed ECC value to recover the data. The recovered data is then sent to the requesting entity. The recovered data may also be loaded back into the memory device 422, overwriting the corrupted data. Controller 418 also checks a parity bit when reading information from the main directory region 702. And, if the information in the main directory region 702 is updated, such as by adding P0 to the sharer list 716, the memory controller 418 computes a new ECC value and stores it in ECC field 720.

In some SMP systems that use ordered Q1 commands, a fill marker mechanism is employed to inform a processor that its request, such as a Read command, has accessed the home memory's directory, and that the requested data is in the process of being returned to the processor. Typically, the fill marker mechanism is implemented through the issuance of a separate Marker command by the memory subsystem to the processor upon access to the directory. In the illustrative embodiment, memory controller 418 does not send a separate Marker command message in response to Read commands. Nonetheless, those skilled in the art will recognize that a fill maker mechanism could be implemented by SMP system 300.

At processor P0, the Fill command is received at the probe/response queue 410, and the MAF engine 412 searches the MAF table 414 for an entry corresponding to the address contained in the received Fill command. The MAF engine 412 transitions the state reflected in the Fill/Marker state field 520 from the active state to the idle state, and the matching entry is rendered inactive by de-asserting the active flag 502. The data included with the Fill command is loaded into P0's cache and the respective entry 600 of the cache tags storage device 406 is up-dated. Specifically, the tag field 602 is loaded with the address of the received cache line, the shared and valid flags 604 and 608 are asserted and the dirty flag 606 is de-asserted.

ReadMod Command

Suppose that, instead of wanting just read access to a cache line, processor P0 wishes to obtain write access over a cache line that is not present in its cache.

In this case, processor P0 preferably issues a Read-_Modify (ReadMod) command on the Q0 virtual channel specifying the address of the desired cache line. Processor P0 also directs MAF entity 416 to establish an entry in the MAF table 414 for the outstanding ReadMod command. MAF entity 416 asserts the active flag 502, loads the command field 504 with an opcode indicative of a ReadMod command, and enters the address of the cache line in the address field 506. In addition, MAF entity 416 transitions the Fill/Marker state as reflected in field 520 from the idle state to the active state. The remaining fields of the MAF table entry 500 may be de-asserted. System 300 routes the ReadMod command from processor P0 to the cache line's home memory subsystem 302a.

At memory subsystem 302a, the memory controller 418 accesses the area specified by the address of the ReadMod command, and retrieves the corresponding directory entry, i.e., entry 706a. The memory controller 418 first examines the information stored in the owner/sharer field 714 and the writer field 722 of the identified entry 706a. Because the contents of both the owner/sharer field 714 and the writer field 722 are the same, i.e., they both indicate memory, the memory controller 418 concludes that it is the owner of the cache line, and that the version stored at its memory 422 is the most up-to-date. The memory controller 418 also checks the sharer column 712 to see whether any other entities have a shared copy of the requested cache line. In this case, no entities have a shared copy of the cache line. Accordingly, the memory controller 418 responds to the ReadMod command by sending processor P0 a copy of the cache line from its memory device 422.

Specifically, the memory controller 418 issues a Fill_Modify (FillMod) command on the Q2 virtual channel that includes the address and data of the requested cache line. Because P0 is requesting write access to the cache line, the memory controller 418, inserts P0's identifier (ID) into the entry's owner/sharer field 714 replacing the current value, i.e., memory. Nonetheless, the memory controller 418 does not modify the contents of the entry's writer field 722. Entry 706c (FIG. 7) illustrates how entry 706a would appear following the updates performed by the memory controller 418 in response to the ReadMod command from P0.

If, at the time the ReadMod command is received at the memory controller 418, the sharer column 712 of entry 706a indicated that one or more entities have a shared copy of the cache line, the memory controller 418 would issue an Invalidate (Inval) command on the Q1 virtual channel to each such entity directing them to invalidate their copies of the cache line. Supposing there were two such entities, the memory controller 418 would also have set an invalid count within the FillMod command to two. When the FillMod command is received at P0, the corresponding MAF entry is located and the Inval Count field 508 is set to two as specified by the FillMod command.

In response to the Inval commands from the memory controller 418, the other entities invalidate their copies of the cache line and send Invalid_Acknowledgement (IAck) commands on the Q2 virtual channel to P0. In response to each IAck command, P0 increments by one the Ack Count field 510 of the respective MAF entry 500. The MAF engine 412 continuously checks the values of the Inval Count and Ack Count fields 508 and 510. When the two values are the same, indicating that each and every entity that had a shared copy of the cache line has invalidated its copy, P0 considers the cache line to be consistent and available to it for processing.

Suppose, after granting P0 write access over the cache line, another processor, e.g., processor P1, issues a Read command for the cache line. The Read command is routed by the SMP system 300 to memory subsystem 302a which is the cache line's home memory. The memory controller 418 locates the directory entry, i.e., entry 706c, corresponding to this cache line and examines the information stored in the owner/sharer field 714 and the writer field 722 of the identified entry 706a. As the owner/sharer field 714 indicates P0 and the writer field 722 indicates memory, the two values are not the same. In this case, the memory controller 418 concludes that the entity specified in the owner/sharer field 714, i.e., P0, rather than the memory subsystem itself, is the owner and has the most up-to-date version of the cache line. Accordingly, the memory controller 418 issues a Forwarded_Read (FRead) command on the Q1 virtual channel to P0. The memory controller 418 updates the sharer list column 716 for this directory entry to reflect that processor P1 has a shared copy of the cache line. The memory controller 418 does not, however, modify either the owner/sharer field 714 or the writer field 722. Entry 706d (FIG. 7) illustrates how entry 706c would appear following the updates performed by the memory controller 418 in response to the Read from P1.

P0 responds to the FRead by sending a copy of the cache line from its cache to P1 on the Q2 virtual channel.

ReadMod Command with Other Processor as Owner

Suppose a third processor, P2, now issues a ReadMod command for this same cache line. The ReadMod is routed by the SMP system 300 from processor P2 to memory subsystem 302a which is the home memory for this cache line. The memory controller 418 accesses the area of memory device 422, and retrieves the directory entry, i.e., entry 706d, corresponding to this cache line. Controller 418 then examines the information stored in the owner/sharer field 714 and the writer field 722 of the identified entry 706d. As the two values are not the same, the memory controller 418 concludes that P0, rather than the memory subsystem itself, is the owner and thus has the most up-to-date version of the cache line. Memory controller 418 also examines the sharer list column 716 and determines that P1 has a shared copy of the cache line. In this case, the memory controller 418 issues a Forwarded_Read_Modify (FReadMod) command on the Q1 channel to P0, and an Inval command on the Q1 channel to P1. In the illustrative embodiment, the FReadMod command also carries an inval count of two. The memory controller 418 also updates the directory entry to reflect that P2 is now the owner/sharer of the cache line and that there are no sharers. The memory controller 418 does not modify the writer field 722. Entry 706e (FIG. 7) illustrates how entry 706d would appear following the updates performed by the memory controller 418 in response to the ReadMod command from P1.

In response to the FReadMod command, P0 issues a FillMod command on the Q2 virtual channel to P2 containing the cache line. The FillMod command preferably has an Inval Count of two, reflecting that there are two entities with a copy of the cache line, i.e., P0 and P1. P0 also invalidates its copy of the cache line by de-asserting the cache tag entry's valid flag 608, and sends P2, either individually or as part of the FillMod command, an IAck command on the Q2 channel. In response to the Inval command, P1 also invalidates its copy of the cache line and sends an IAck command to P1. As each IAck command is received at P1, its MAF engine 412 increments the Ack Count field 510 of the corresponding MAF entry 500 by one. When the Inval Count and Ack Count fields 508 and 510 are equal, the cache line is considered to be consistent and may be processed, e.g., read and/or modified, by P2.

Write Back Command

When P2 is finished with the cache line, it writes the cache line back to memory subsystem 302a in order to make room in its cache for other cache lines. In the illustrative embodiment, the processor module 402a (FIG. 4) does not include a separate write-back or victim buffer. Instead, a cache line that is being victimized from the processor's cache is written-back to memory directly from the cache. With the prior art solutions, writing a cache line back to memory required an atomic read-modify-write cycle to be performed by the processor. Such read-modify-write cycles require significant time to complete and consume substantial system resources, including bandwidth. They also divert the processor from performing other, possibly more important, tasks. With the present invention, write-backs are performed without having to impose atomic read-modify-write cycles on the computer system.

When a processor, such as P2, wishes to write-back a cache line over which it has write access, it first checks the corresponding tag entry 600. Specifically, P2 confirms that the dirty flag 606 and the valid flag 608 are both asserted, thereby indicating that P2 is the owner of the cache line to be written back and that the cache line is still valid. Only those memory blocks that were acquired by a processor with a request for exclusive or write access may subsequently be written back to main memory. If the dirty flag 606 is not asserted and/or the cache line is invalid, P2 is precluded from writing the cache line back to memory. P2 also checks its MAF table 414 to see if a MAF entry 500 already exists for the cache line to be written back. If there is a MAF entry 500, P2 confirms that the entry is inactive, that there are no outstanding IAcks for the cache line, i.e., that the Inval Count field 508 equals the Ack Count field 510, that the read pointer and write pointer fields 512 and 516 are both invalid, and that the fill/marker state field 520 is set to the idle state. If there are one or more outstanding IAcks or the MAF entry is active, the processor is precluded from writing the cache line back to memory.

As indicated above, in addition to the four previously discussed virtual channels: QIO, Q0, Q1 and Q2, a new virtual channel, the QWB virtual channel, is defined within the SMP system 300. As with the other virtual channels, the QWB virtual channel is an independently flow-controlled, ordered channel of command packets or commands that shares common physical interconnect link and/or buffering resources with the other ordered virtual channels. The QWB virtual channel is further defined within the SMP system 300, as mentioned above, so as to have a priority level that places it above the Q1 virtual channel, but below the Q2 virtual channel.

Assuming the cache line is valid and dirty, and that MAF entry satisfies the above checks, a processor, such as P2, simply issues a Write_Back (WB) command to main memory. The WB command, which includes the cache line and its address, is preferably issued on the new QWB virtual channel. The tag entry 600 may then be invalidated and the entry made available to store a new cache line. No copy of the cache line or block being written back is kept at processor P2 upon issuance of the WB command. In the preferred embodiment, the processor P2 also creates a new entry 500 in the MAF table 414 for the WB command. The processor P2 asserts the active field 502, enters an opcode associated with the WB command into the command field 504 and enters the block's address into the address field 506.

The WB command is routed by the SMP system 300 to memory subsystem 302a, which is the block's home memory. At the memory subsystem 302a, the memory controller 418 responds to the WB command by storing the modified data appended to the WB command in memory device 422 overwriting the previous data contents of the memory block. The memory controller 418 also updates the directory entry's write-back region 704. Specifically, the writer field 722 of the directory entry, i.e., entry 706e, corresponding to the block that is being written back is updated with the ID of the processor that issued the WB command, i.e., processor P2. Significantly, the memory controller 418 does not make any change to the entry's owner/sharer field 714 or to the entry's sharer list 716. Entry 706f (FIG. 7) illustrates how entry 706e would appear following the write-back operation by P2.

In addition to storing the modified data at the memory device 422, the memory controller 418 preferably computes a new ECC value for the data and stores this new ECC value along with the block. Furthermore, because it has changed the contents of the write-back region 704, the memory controller 418 also computes a new ECC value for the information in region 704 and stores this new value in the ECC field 726.

As shown, to perform a write-back, processor P2 does not read the contents of the owner/sharer field 714 to determine whether or not it can even proceed with the write back. Furthermore, as part of the write-back operation of the present invention, no modification is made to the owner/sharer field 714. Instead, the only field that is modified is the writer field 722, which is part of the new write-back directory region 704. After updating the entry's writer field 722, the memory controller 418 returns a WB_Acknowledgement (WBAck) command to P2. The WBAck is preferably issued on the Q2 virtual channel, which has a higher order than the QWB virtual channel. In response to receiving the WBAck command, P2 causes the MAF entry 600 that was created for the WB command to be deactivated, e.g., by de-asserting the active field 502.

Suppose that, following P2's write-back of the block, some other processor in the SMP system 300, e.g., processor P3, now issues a Read command for the cache line. As described above, the Read command is routed by the SMP system 300 to memory subsystem 302a, which is the home memory for the cache line. The memory controller 418 responds to the Read command by accessing the directory entry, i.e., entry 706f, that corresponds to the requested block. The memory controller 418 compares the contents of the owner/sharer field 714 with the contents of the writer field 722 from the directory's write-back region 704. Because the WB command from P2 modified the writer field 722 but not the owner/sharer field 714, the values in the two fields are now the same, i.e., they both contain P2's ID. As the values stored in the two fields 714, 722 are the same, the memory controller 418 concludes that it is the owner of the requested block, and that it has the most up-to-date version in its memory 422. Controller 418 reaches this conclusion even though the owner/sharer field 714 does not indicate memory as the block's owner. Because the two fields 714, 722 contain the same value, the memory controller 418 responds to the Read command from processor P3 by issuing a Fill command on the Q2 channel which includes a copy of the block taken from its memory device 422. The memory controller 418 also updates the directory entry by adding P3 to the sharer list field 716. The memory controller 418 does not modify either the owner/sharer field 714 or the writer field 722. Entry 706g (FIG. 7) illustrates how entry 706f would appear following the Read command from processor P3.

Except for the condition noted below, the writer field 722 of the directory's write-back region 704 is only modified in response to a WB command from a processor (or other system entity) performing a write-back of data to memory. The WB command, moreover, does not result in the contents of the owner/sharer field 714 being read or modified. The memory controller 418, moreover, updates the contents of a directory entry immediately in response to the received command, e.g., Read command, ReadMod command, WB command, etc. Such updates are not dependent upon the memory controller 418 receiving additional information, such as Acks, from system entities.

It should be understood that write-backs must be strictly serialized. That is, at any point in time, the cache coherency protocol ensures that only a single processor can issue a WB command for a given memory block. In the illustrative embodiment, this is accomplished by permitting only a single entity to have write or exclusive access to a given memory block. A second entity requesting write access over the given memory block is not granted such access until the previous owner has either been invalidated or has written the memory block back to main memory. Accordingly, at any given point in time, the cache coherency protocol permits only a single entity to issue a WB command for a given memory block.

As shown, the processors 404 and directories 420 cooperate to execute a generalized low occupancy cache coherency protocol. The protocol is "generalized" in that it can support processors that share memory blocks that are in the dirty state as well as processors that are precluded from sharing memory blocks that are in the dirty state. A dirty-shared processor responds to a snoop read, e.g., a FRead command, identifying a block in the dirty state by sending a copy of the block from its cache to the source of the snoop read. The dirty-shared processor does not, in response to the snoop read, write a copy of the block back to main memory. Accordingly, multiple processors may have a "dirty" copy of a memory block, although only one processor, the owner, can write the block back to main memory. Non-dirty shared processors do not support dirty blocks being held in more than one cache. In particular, if a non-dirty shared processor receives a snoop read identifying a block in the dirty state, the processor typically writes the block back to main memory, thereby requiring the source of snoop read to obtain a copy of the block from memory. Alternatively, the non-dirty shared processor may return the dirty block to main memory but also forward a copy of the block from its cache to the source of the snoop read. As described in co-pending application Ser. No. 10/263,741, and titled COMPUTER SYSTEM SUPPORTING BOTH DIRTY-SHARED AND NON-DIRTY-SHARED DATA PROCESSING ENTITIES, which is hereby incorporated by reference in its entirety, the illustrative cache coherency protocol supports both types of processors.

The protocol is also considered a "low occupancy" protocol, because of the following attributes. First, each command only has to access the directory 420 once. Second, directory changes are deterministic based on the current directory state and the type of the received command. That is, the resulting state or form of a directory entry is solely a function of the current state or form of the entry and the received command. Third, the directory 420 neither creates nor requires any transient states or the return of acknowledgements in order to maintain coherency. Accordingly, once the directory 420 has updated the appropriate fields and issued the required commands, e.g., ReadMods, Invals, etc., it can immediately process another command for the same memory block even though the previous commands have yet to reach their targets.

Preferably, the SMP system 300 does not include a single, total ordering point for all references issued to the shared memory. Each directory 420, however, represents or provides a local serialization point for requests directed to the memory blocks of the respective memory subsystem 302. That is, as indicated above, the memory controller 418 imposes a serial order on all requests to the same memory block. To improve efficiency, the memory controller 418 may be configured to process requests to different memory blocks simultaneously or substantially simultaneously, e.g., through the use of multiple, interleaved memory banks.

In accordance with the preferred embodiment of the present invention, the virtual channels, i.e., the logic, fabric links, and other resources on which the virtual channels are built, must guarantee delivery of all commands within the SMP system 300. The cache coherency protocol assumes that all commands issued in connection with a memory reference operation will be received by their intended targets.

Figure 8:
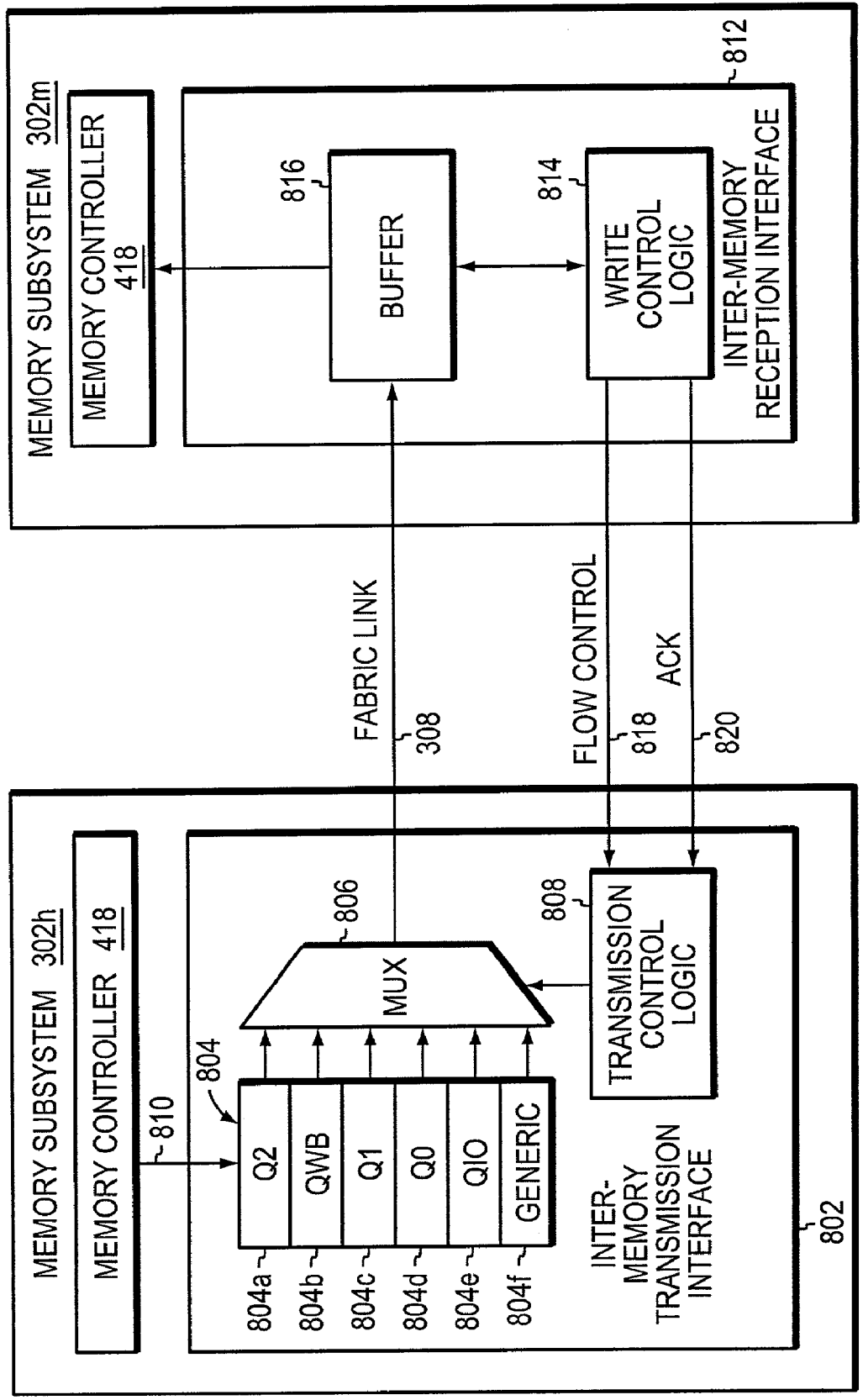
FIG. 8 is a highly schematic, function block diagram of interconnect logic between two sockets.

FIG. 8 is a partial, functional block diagram of the interconnect logic between two memory subsystems 302h and 302m. Each memory subsystem has a memory controller 418 and the two subsystems 302h, 302m are interconnected by a fabric link 308. It should be understood that the subsystems may be interconnected indirectly through other memory subsystems and multiple fabric links. Memory subsystem 302h includes an inter-memory transmission interface 802. Interface 802 has a transmit buffer 804, a multiplexer (MUX) 806 coupled to buffer 804 and transmission control logic 808 operatively coupled to MUX 806. Buffer 804 is organized into a plurality of entries 804a–f, some of which, e.g., entries 804a–e, are separately configured to store commands for a respective virtual channel. In particular, entry 804a stores Q2 type commands, entry 804b stores QWB type commands, which are described below, entry 804c stores Q1 type commands, entry 804d stores Q0 type commands, and entry 804e stores QIO type commands. Buffer 804 further includes generic entry 804f that can be used for storing commands associated with any of the virtual channels. The multiplexer (MUX) 806 is coupled to buffer 804 to select one of the buffer entries for forwarding a command stored therein over fabric link 308 to memory subsystem 302m in response to a select signal from transmission control logic 808. Commands are received into buffer 804 from the memory controller 418 of memory subsystem 302h as illustrated by arrow 810.

Transmission control logic 808 and MUX 806 cooperate to ensure that lower-order channels do not block higher order channels. For example, each channel may utilize separate resources as described in U.S. Pat. No. 6,014,690. Those skilled in the art will recognize that other alternatives may also be utilized, such as a fixed priority scheme in which all commands stored in the Q2 entry 804a are sent first, then all commands stored in the QWB entry 804b are sent, followed by all commands in the Q1 entry 804c and so on.

Although dedicated entries have been shown in buffer 804 as having fixed locations, it should be understood, that any of locations within buffer 804 can be configured as a dedicated entry and that the dedicated entries can be dynamically assigned to respective virtual channels on an as needed basis. Such assignment is monitored by the transmission control logic 808.

It should be understood that the QIO entry 804e may be eliminated and all QIO commands received at interface 802 placed in either the Q0 and/or the generic entries 804d and 804f.

Memory subsystem 302m has an inter-memory reception interface 812 that includes write control logic 814 operatively coupled to a buffer 816. Buffer 816 may also be organized into a plurality of entries (not shown), including separate entries for storing commands associated with each virtual channel as well as a generic entry for buffering commands from any virtual channel. Fabric link 308 is coupled to buffer 814 so that commands transmitted by the MUX 806 from memory subsystem 302h can be received into buffer 814. The write control logic 814 controls the flow of data into buffer 816 by asserting a flow control signal on line 818 and an Acknowledgement (ACK) signal on line 820 which are both coupled to transmission control logic 808. The flow control signal, which is used to stop transmission of commands, and the ACK signal on line 820 indicates that a command associated with a respective virtual channel has been released from buffer 816.

Write control logic 814 asserts the flow control signal when it determines that the capacity of the generic entries configured at buffer 816 is insufficient to accommodate all of the possible commands that may be in transit to inter-memory reception interface 812. The assertion of the flow control signal does not stop all transmissions as the inter-memory reception interface 812 may still receive a command if an entry of buffer 816 dedicated to a respective virtual channel is available.

It should be understood that the transmission control logic 808 and the write control logic 816 may implement one or more counters and registers (not shown), and they may further exchange count information to provide flow control over the transmission of commands.

It should be understood that memory subsystem 302h also has an inter-memory reception object for receiving commands, and that memory subsystem 302m has an inter-memory transmission interface for sending commands to other memory subsystems.

In the illustrative embodiment, the transmission and reception interfaces 802, 812 are also configured to guarantee that all commands flowing through the SMP system 300 will reach their destinations. Such an arrangement eliminates the need for acknowledgements or retries.

Late Race Condition

FIGS. 9A–C and 10A–C illustrate the channel-based mechanism of the present invention for resolving late race conditions.

Figure 9A:
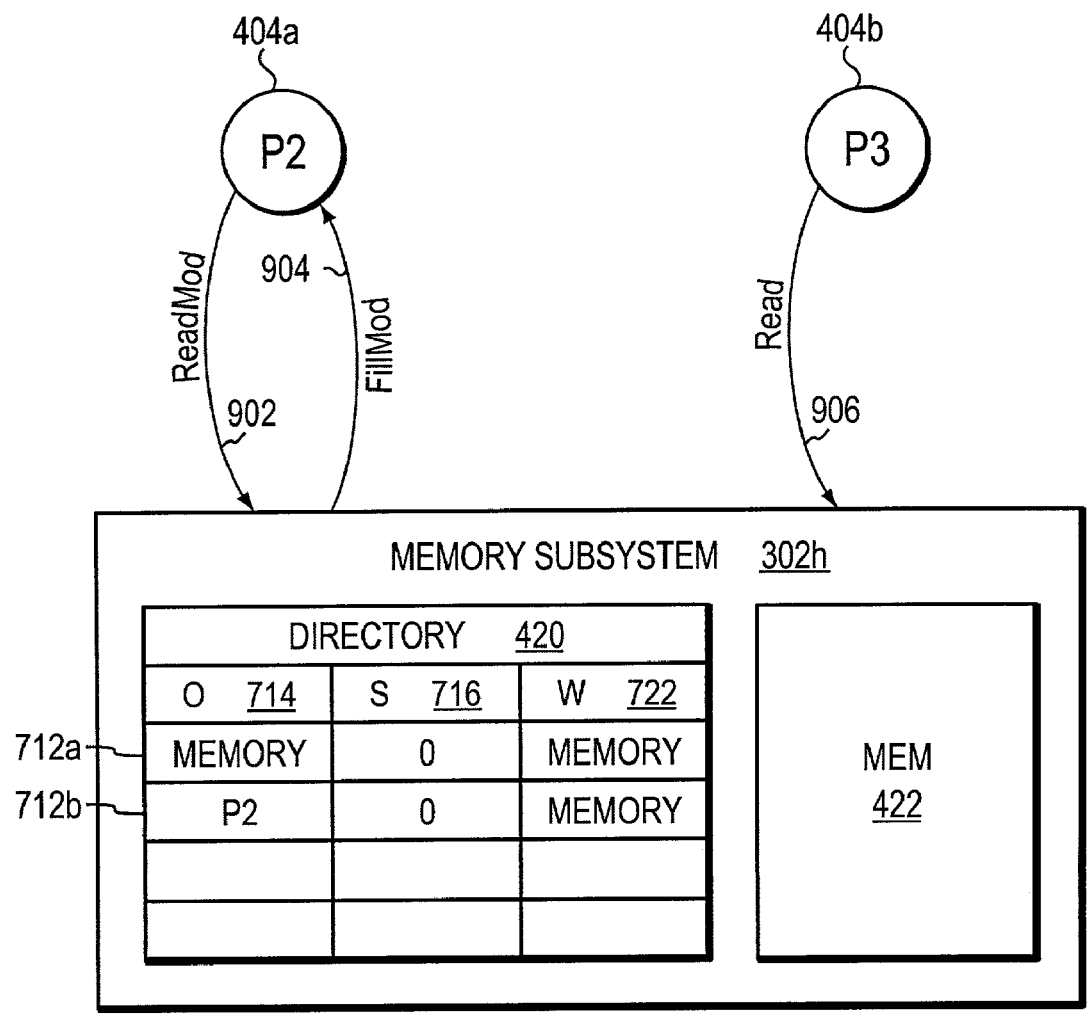
FIGS. 9A–C and 10A–C illustrate an exemplary exchange of command packets between a plurality of processors and a memory subsystem.

Referring to FIG. 9A, suppose that a processor, e.g. processor P2 also designated by reference numeral 404a, issues a ReadMod command 902 for a specified memory block. The ReadMod command 902 is routed to the home memory subsystem, e.g. memory subsystem 302h having a directory 420 and one or more memory devices 422. For simplicity, only the owner column 714, the sharer list column 716 and the writer column 722 are shown. The memory controller 418 (FIG. 4) accesses the directory entry, e.g., entry 712a (FIG. 9A), for the specified memory block. Directory entry 712a indicates that memory is both the owner and writer of the specified memory block. Accordingly, the memory controller issues a FillMod command 904 to processor P2 on the Q2 virtual channel and updates the directory entry by inserting P2's ID in the owner field 714. Entry 712b (FIG. 9A) illustrates how entry 712a would appear following the completion of the ReadMod command 902 by memory subsystem 302h.

Now, suppose another processor, e.g., processor P3 also designated by reference numeral 404b, issues a Read command 906 for the same memory block to which processor P2 obtained write access. The Read command 906 is also routed to memory subsystem 302h, and the memory controller accesses the directory entry, i.e., entry 712b. Directory entry 712b indicates processor P2 is the current owner and memory was the last writer. As the two fields 714, 722 contain different values, the memory controller concludes that processor P2, whose ID is stored in the owner/sharer field 714, is the current owner of the memory block.

Figure 9B:
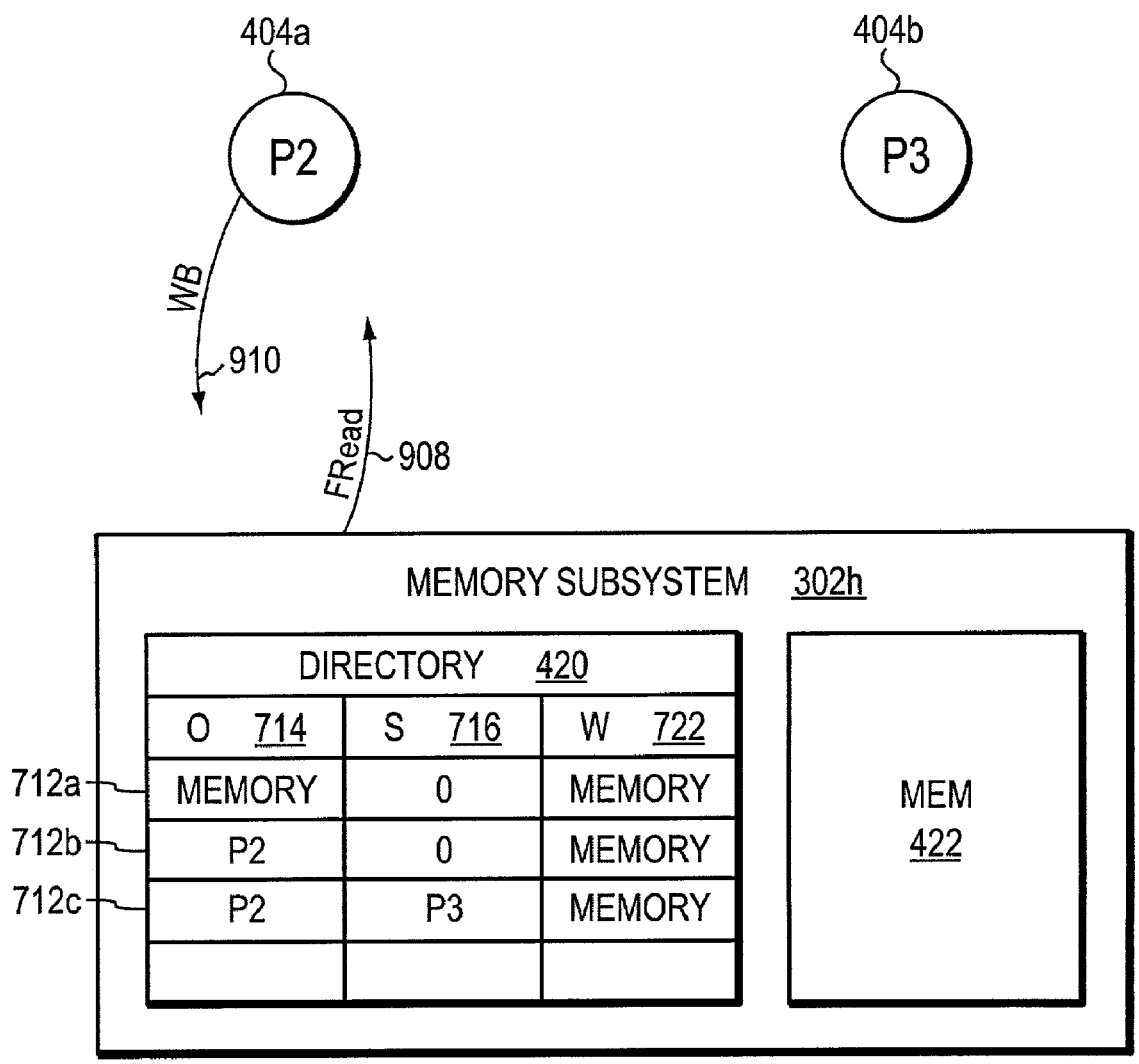

Accordingly, as shown in FIG. 9B, the memory subsystem 302h issues a probe, such as a FRead command 908, to processor P2 on the Q1 virtual channel. The FRead command 908 instructs P2 to send P3 a copy of the memory block from P2's cache thus satisfying P3's read. In addition to issuing the FRead command 908, memory subsystem 302h also updates the directory 420 to reflect that P3 is now a sharer of the memory block. More specifically, the memory controller enters the ID assigned to processor P3 into sharer list field 716. Directory entry 712c illustrates how entry 712b would appear upon completion of the Read command 906 by the memory subsystem 302h.

Suppose further, however, that sometime before the FRead command reaches P2, that P2 issues a WB command 910 on the QWB virtual channel returning the modified data to memory subsystem 302h. When the FRead command 908 is received at P2, it is placed in the probe/response queue 410 (FIG. 4) and a search is performed of the cache tags storage device 406 based on the address specified in the FRead command 908. Queue 410 also searches the entries of MAF table 414 using the address of the command as an index to determine whether the probe collides with an active MAF entry. However, because the memory block was victimized from P2's cache upon issuance of the WB command 910, the search of cache tags storage device 406 results in a cache miss. A search of MAF table 414, however, identifies a matching entry for the address specified in the FRead command 908. The MAF entry, moreover, indicates that the memory block was returned to memory subsystem 302h in WB command 910.

When a memory reference operation, such as FRead command 908, misses on the cache of its intended target, i.e., P2, a late race condition is said to occur whether or not a matching MAF entry is pending.

According to the present invention, the late race condition is resolved through the creation and use of the new, additional virtual channel, the QWB virtual channel and the definition of several new commands. The present invention, moreover, resolves the late race condition without sacrificing the low occupancy features of the cache coherency protocol implemented within the SMP system 300.

Figure 9C:
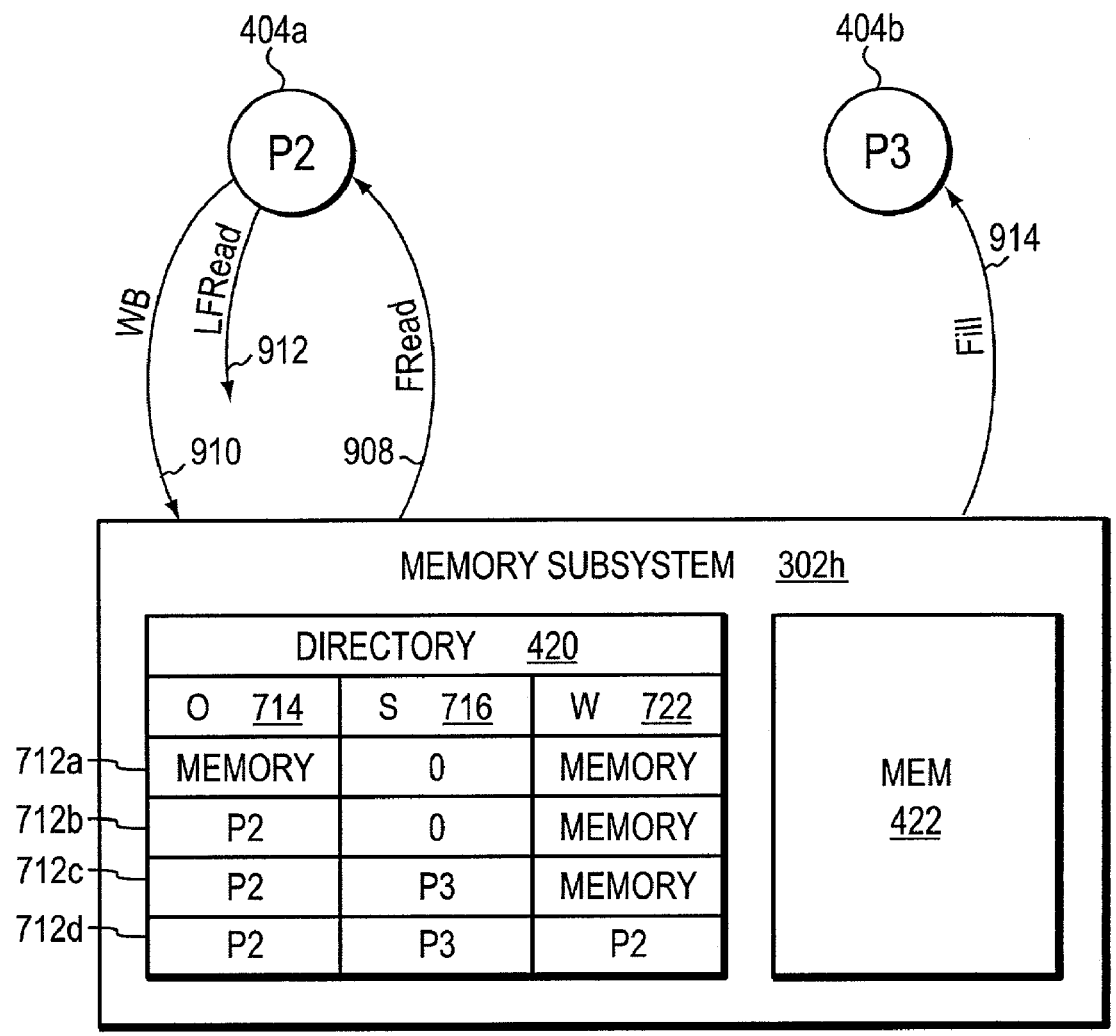

Referring to FIG. 9C, when the FRead command 908 misses at P2's cache tags storage device 406, P2 is configured to respond by issuing a new command, referred to as a Loop command, also on the new QWB virtual channel. In the current example, the Loop command, which is sent to the home memory subsystem 302h, is preferably a Loop_Forwarded_Read (LFRead) command 912. The LFRead command 912, among other things, carries the identifier of the source of the command, i.e., the processor ID (PID) assigned to P2, and the identifier of the requesting entity specified in the FRead command 908, i.e., P3's PID. Because the QWB virtual channel, like the other virtual channels, operates as an ordered channel, the WB command 910 arrives at the home memory subsystem 302h before the LFRead command 912. When the WB command 910 is received at memory subsystem 302*h*, the modified data is written to the memory device 422 and the writer field 722 of the directory entry, i.e., entry 712*c*, is updated with the ID assigned to P2. Directory entry 712*d* illustrates how entry 712*c* would appear following the processing of the WB command 910 at memory subsystem 302*h*. In particular, writer field 722 is updated, but owner and sharer fields 714 and 716 are left unchanged.

When the LFRead command 912 is subsequently received at memory subsystem 302*h*, the memory controller accesses the directory entry, i.e., entry 712*d*, and compares the value in the writer field 722 with the identifier of the source of the LFRead command 912, i.e., P2, as specified therein. As the two values are the same, in light of the previously executed WB command 910 from processor P2, memory controller 418 concludes that it is the owner of the memory block and that memory device 422 has the most up-to-date version. Accordingly, the memory controller responds to the LFRead command 912 by sending the requested data to the entity specified in the LFRead command 912, i.e., to processor P3. That is, the memory controller 418 issues a Fill command 914 on the Q2 virtual channel to P3. The Fill command 914 includes a copy of the memory block taken from memory device 422.

Because P3 was already added to the sharer list field for this directory entry, it need not be added again. Indeed, the LFRead command 912 does not cause any change at all the directory state.

It should be understood that upon processing the WB command 910 from P2, the home memory subsystem 302*h* also sends a WBAck (not shown) to P2 on the Q2 virtual channel. P2 responds to the WBAck by de-activating the MAF entry that it created to track its WB command 910.

Suppose P3 issues a ReadMod command instead of Read command 906. In response, the memory controller issues a FReadMod command to P2 as well as an invalidate, rather than FRead command 908. The FReadMod command, moreover, specifies an Inval count of one, since the directory entry at the time of the ReadMod command indicated that only P2 had a copy of the memory block. The memory controller also modifies the directory entry by inserting P3's ID into the owner/sharer field 714 of directory entry 712*b*. In response to the FReadMod command missing at P2' cache, P2 preferably responds by issuing a Loop command, in this case a Loop_Forwarded_Read_Modify (LFRead-Mod) command, on the QWB virtual channel, to memory subsystem 302*h*. Like the LFRead command 912, the LFReadMod command also carries the identifier of the source of the command, i.e., P2, and the identifier of the entity that is requesting the memory block, i.e., P3. The LFReadMod command may further carry the same inval count, i.e., one, as specified in the FReadMod command.

Because the QWB virtual channel is an ordered channel, the WB command from P2 is received at the home memory subsystem 302*h* before the LFReadMod command from P2. Accordingly, upon receipt of the LFReadMod command, the directory entry's writer field will match the source of the LFReadMod command, i.e., processor P2. In response, the memory subsystem 302*h* issues a FillMod command on the Q2 virtual channel to the requesting entity specified in the LFReadMod command, i.e., processor P3. The FillMod command preferably specifies an Inval count of one as indicated in the LFReadMod command. Like the LFRead command 912, the LFReadMod command does not result in any change to the directory state. Upon receipt of the FillMod command, processor P3 sets the Inval Count field 508 of the MAF entry 500 it created for this transaction to one.

In addition to issuing the FillMod command, memory subsystem 302*h* also issues an IAck command on the Q1 virtual channel to processor P3. This IAck is issued on behalf of P2 which was listed as the block's owner at the time of P3's ReadMod command. In response to the IAck command, processor P3 sets the Ack Count field 510 to one. As the value of the Inval Count field 508 equals the value of the Ack Count field 510, processor P3 considers the memory block to be consistent and available to it for processing.

It should be understood that rather than sending the FillMod and IAck commands separately, they may be combined and sent as a single command.

It should be further understood that the same process is followed when the snoop, e.g., FRead command 908, misses on both P2's cache and P2's MAF. This may occur when the memory subsystem 302*h* receives the WB command 910 from P2, returns a WBAck command to P2 and the WBAck command is received (thus causing the MAF entry at P2 to be cleared) before the FRead command 908 is received at P2.

Invalidate to Dirty

The channel-based mechanism of the present invention can also resolve late race conditions involving other commands, such as an Invalidate_to_Dirty (I2D) command. As indicated above, a memory block or cache line, which is preferably 128 or 64-bytes, is the minimum unit of information, e.g., data and/or instructions, that is moved about the system. When an entity intends to write to something less than a full memory block, such as a quadword which is 32-bytes, it typically issues a ReadMod command, and in response receives the entire memory block including the 32-bytes of interest. The entity then writes the new data to the identified quadword, leaving the remaining portions of the memory block unchanged. The entire memory block, including the modified quadword, can then be written back to main memory. If an entity, such as a processor or an I/O bridge, intends to write the entire contents of a memory block, it may issue an I2D command. Since the entity is writing to the entire memory block, it does not care what the current version of the memory block is. The response to an I2D command is a Success command which does not include a copy of the specified memory block.

Figure 10A:
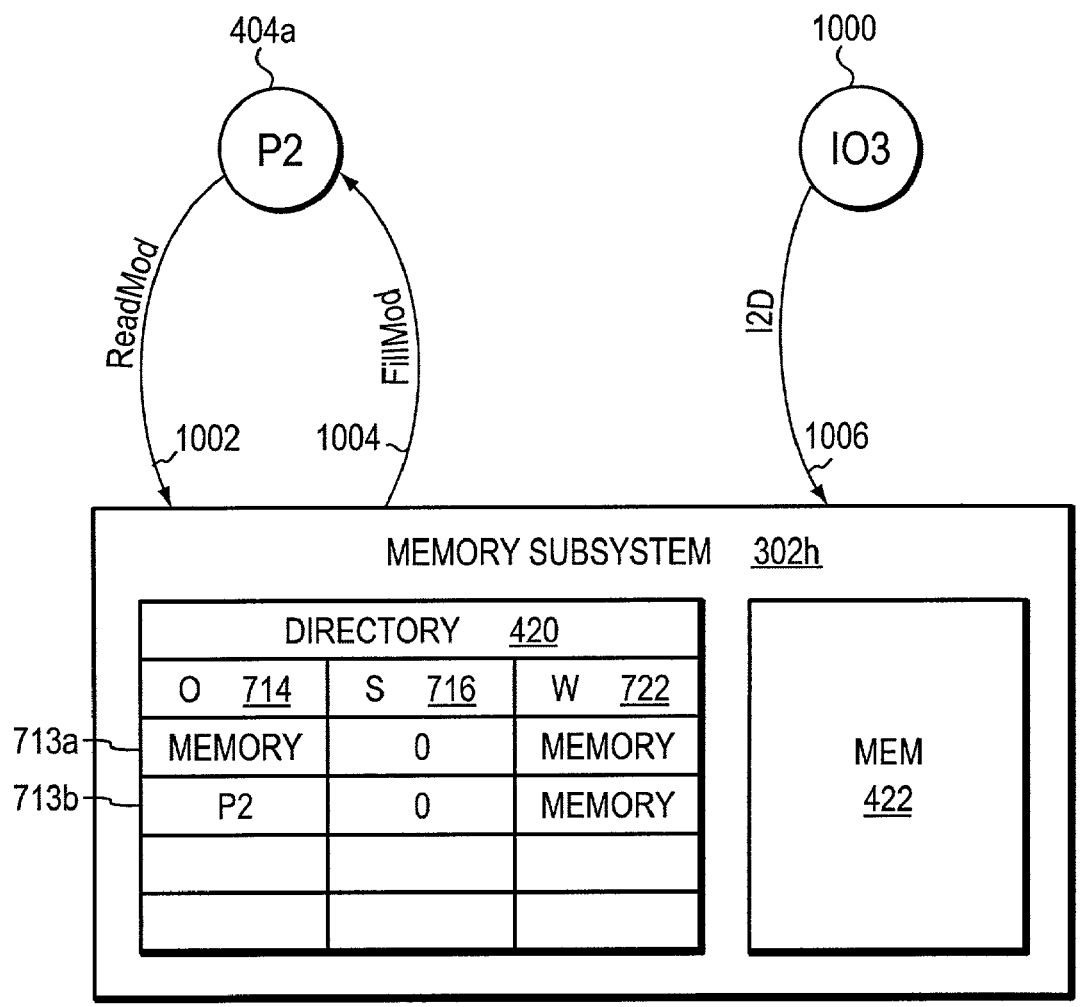
Figure 10B:
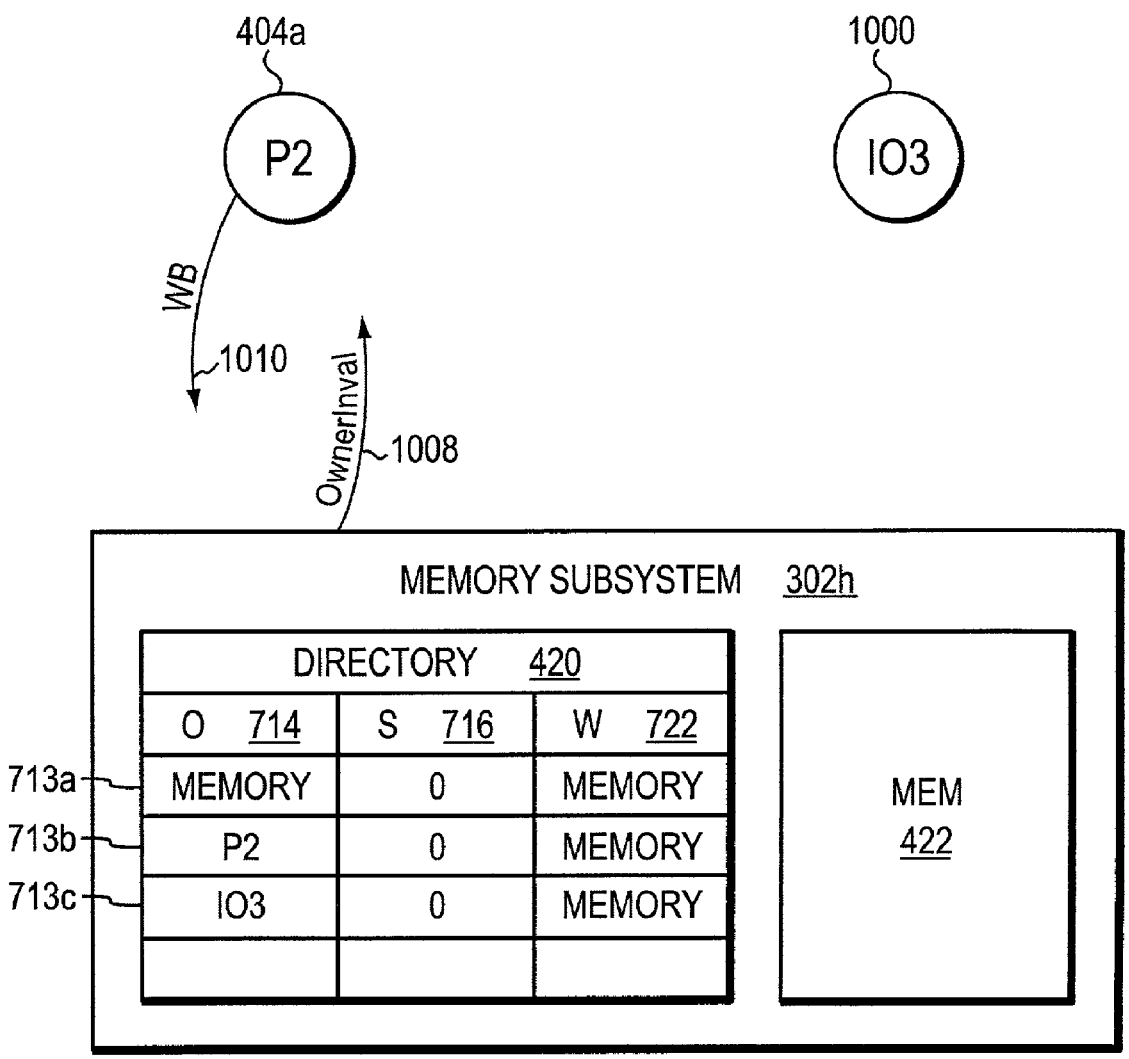
Figure 10C:
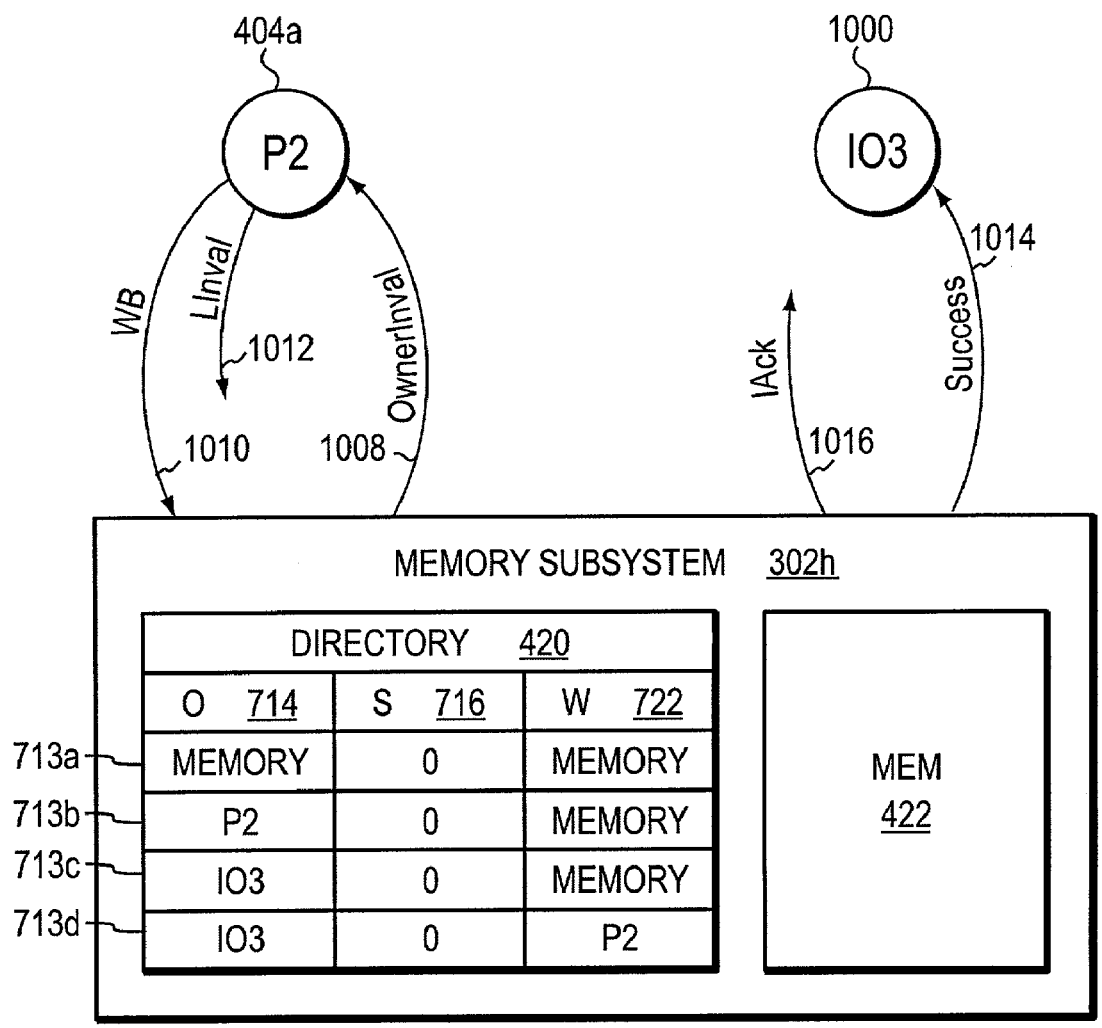

FIGS. 10A–C illustrate the late race resolution mechanism of the present invention as relating to I2D commands.

Referring to FIG. 10A, suppose that a processor, e.g. processor P2 also designated by reference numeral 404*a*, issues a ReadMod command 1002 for a specified memory block. The ReadMod command 1002 is routed to home memory subsystem 302*h* having directory 420 and one or more memory devices 422. The memory controller 418 (FIG. 4) accesses the directory entry, e.g., entry 713*a* (FIG. 10A) for the specified memory block. Directory entry 713*a* indicates that memory is both the owner and last writer of the specified memory block. Accordingly, the memory controller issues a FillMod command 1004 to processor P2 and updates the directory entry by inserting P2's PID in the owner field 714. Entry 713*b* (FIG. 10A) illustrates how entry 713*a* would appear following the completion of the Read-Mod command 1002 from processor P2. Now, suppose another entity, e.g., an I/O bridge, such as I/O bridge IO3 also designated by reference numeral 1000, issues an I2D command 1006 for the same memory block to which processor P2 obtained write access. The I2D command 1006 is also routed to memory subsystem 302*h*, and the memory controller accesses the directory entry, i.e., entry 713b. Directory entry 713b indicates processor P2 as the current owner, memory as the last writer, and no sharers.

In the illustrative embodiment, memory subsystems 302 are configured to issue two types of invalidates: Owner_Invalidates (OwnerInvals) and vanilla or regular Invalidates (Invals). In response to an I2D command, a memory subsystem 302 preferably issues an OwnerInval to the block's owner, if any, and an Inval to each sharer, if any.

As P2 is the owner of the block specified by the I2D command 1006, the memory subsystem 302h preferably issues an OwnerInval command 1008 (FIG. 10B) to P2 on the Q1 virtual channel. The OwnerInval command 1008 instructs P2 to invalidate the memory block from its cache and to respond to IO3 with a Success command and an IAck command. As P2 is the only entity with a copy of the memory block, the OwnerInval command 1008 may also specify an inval count of one for inclusion in the Success command to IO3, which will cause the IO3 to expect receipt of a single IAck command. As part of its processing of the I2D command 1006, memory subsystem 302h also updates the directory 420 to reflect that the IO3 is now the owner of the memory block. More specifically, the memory controller enters the ID assigned to IO3 into the owner field 714. Directory entry 713c (FIG. 10B) illustrates how entry 713b would appear upon completion of the I2D command 1006 by the memory subsystem 302h.

Suppose again, however, that sometime before the OwnerInval command 1008 reaches P2, that P2 issues a WB command 1010 (FIG. 10B) on the QWB virtual channel returning the modified data to memory subsystem 302h. When the OwnerInval command 1008 is received at P2, a cache miss occurs at P2's cache tags storage device 406, because the memory block was victimized from P2's cache upon issuance of the WB command 1010. A search of P2's MAF table 414, however, identifies a matching entry for the address specified in the OwnerInval command 1008, indicating that the memory block was returned to memory subsystem 302h in WB command 1010.

Because P2 no longer has the modified memory block in its cache, there is no cache line for P2 to invalidate. In this situation, P2 is configured not to issue a Success command to the IO3, which it would have done had the cache line still been present when the OwnerInval command 1008 was received. Instead, P2 issues a Loop command, specifically a Loop_Invalidate (LInval) command 1012 (FIG. 10C), also on the QWB virtual channel to memory subsystem 302h. The LInval command 1012 carries the identifier of the source of the command, i.e., P2, and the identifier of the entity requesting the Success command, i.e., IO3. It also specifies the address of the memory block that is to be invalidated and carries an inval count of one. As before, because the QWB virtual channel is implemented as an ordered channel, the WB command 1010 arrives at the home memory subsystem before the LInval command 1012.

When the WB command 1010 is received at memory subsystem 302h, the modified data is written to the memory device 422 and the writer field 722 of the directory entry, i.e., entry 713c, is updated with the PID assigned to P2. Directory entry 713d illustrates how entry 713c would appear following the processing of the WB command 1010 at memory subsystem 302h. In particular, the writer field 722 is updated, but the owner and sharer fields 714 and 716 are left unchanged.

When the LInval command 1012 is subsequently received at memory subsystem 302h, the memory controller accesses the directory entry, i.e., entry 713d, compares the value in the writer field 722 with the ID of the entity that sourced the LInval command 1012. Here, both the writer field 722 and the source of the LInval command indicate processor P2. In these circumstances, the memory controller 418 responds by issuing a Success command 1014 to IO3. Because the LInval command 1012 carried an inval count of one, the Success command also includes an Inval count of one. The memory subsystem 302h also issues an IAck command 1016 to IO3 on behalf of P2 which was the block's owner at the time of the I2D command 1006. The Success command 1014 and the IAck command 1016 are both preferably sent on the Q2 virtual channel. At IO3, upon receipt of the Success command 1014, the Inval Count field 508 of the MAF entry 500 that was created by IO3 to track the I2D command is set to one. When the IAck command 1016 is received, the Ack count field 510 is incremented from zero to one. As fields 508 and 510 of the IO3's MAF entry 500 are now equal, the IO3 is free to write to the memory block.

If the WB command 1010 from P2 reaches the home memory subsystem 302h and the WBAck command is received at P2 before P2 receives the OwnerInval command 1008, then the OwnerInval command 1008 will miss at P2's cache and P2's MAF. Here, P2 may be configured to issue the Success command and the IAck command to IO3 directly. That is, because the I2D command 1006 is not seeking a copy of the memory block, the target of the snoop, i.e., P2, may issue these commands as the lack of a pending MAF entry indicates that the WB command 1010 has completed at the home memory subsystem 302h. Nonetheless, to reduce complexity, P2 may still issue the LInval command 1012 in the QWB virtual channel rather than issue the Success and IAck commands itself, even in this special case.

It should be understood that the mechanism of the present invention is invoked whenever a Read, ReadMod, I2D or other similar command is received at and processed by a memory subsystem ahead of a WB command for the same memory block.

It should be further understood that, pending receipt of a WB command, the memory subsystems can continue to process other requests for the same memory block by issuing other probes, such as FReads, FReadMods, Invals, OwnerInvals, etc., to the current owner and sharer entities.

Resolving Late Races in an Unordered Network

An alternative embodiment of the present invention can be used in a computer system where the interconnect fabric 306 does not support ordered virtual channels or the system designer does not wish to provide ordered virtual channels. In this embodiment, a fifth virtual channel, the Q3 virtual channel, is added. The Q3 virtual channel has a priority higher than the Q2 virtual channel. WB commands are sent in the Q2 virtual channel rather than the QWB virtual channel. Loop commands are still issued in the QWB virtual channel. The loop commands need to include a field that indicates the ID of the owner, i.e., the target of the FRead, FReadMod or OwnerInval. When a loop command reaches the home memory subsystem, moreover, the memory controller reads the directory and compares the directory entry's writer field 722 to the owner as indicated in the loop command. If the values match, the block and/or IAck is sent to the source of the request. Otherwise, the loop command waits in a queue at the directory for the write-back to arrive, stalling the QWB virtual channel. Stalling the QWB virtual channel is an acceptable solution as the higher priority Q2 virtual channel is used for WB commands, thereby ensuring forward progress. WBAcks from the memory subsystems to the source of WB commands are sent in the Q3 virtual channel.

The foregoing description has been directed to specific embodiments of the present invention. It will be apparent, however, that other variations and modifications may be made to the described embodiments, with the attainment of some or all of their advantages. For example, the SMP system could employ a plurality of physically independent channels, each having its own components, such as buffers, instead of virtual channels that share components. Therefore, it is the object of the appended claims to cover all such variations and modifications as come within the true spirit and scope of the invention.

What is claimed is:

1. In a computer system having a plurality of processors and a main memory organized into a plurality of memory blocks, the processors having one or more caches, a method for resolving a late race condition between a first processor and a second processor for a selected memory block, the method comprising:
   defining a plurality of channels within the computer system for exchanging command packets among the processors and main memory, the channels including a Q0 channel for carrying requests for memory blocks, a Q1 channel, having a higher priority than the Q0 channel, for carrying probes in response to Q0 requests, a Q2 channel, having a higher priority than the Q1 channel, for carrying responses to Q0 requests, and QWB channel having a higher priority than the Q1 channel but lower than Q2 channel;
   issuing a Write_Back (WB) command from the first processor to main memory, the WB command including a modified version of the selected memory block taken from the first processor's cache;
   forwarding from main memory to the first processor a memory reference request specifying the selected memory block, the memory reference request initiated by the second processor;
   in response to the memory reference request, issuing a Loop command from the first processor to main memory on the QWB channel;
   in response to the WB command, writing the modified data back to main memory; and
   in response to the Loop command, issuing a memory reference response from main memory to the second processor.

2. The method of claim 1 wherein the channels are implemented as ordered channels.

3. The method of claim 2 wherein the computer system further includes at least one directory for maintaining status information regarding the memory blocks configured at main memory, the directory having, for each memory block, an owner field specifying the owner of the respective memory block, a sharer list specifying one or more processors, if any, that have a shared copy of the respective memory block, and a writer field specifying the last processor to have written the respective memory block back to main memory, the method further comprising entering an identifier (ID) assigned to the first processor in the writer field of the directory entry for the selected memory block in response to the WB command.

4. The method of claim 3 further wherein the issuing the memory reference response to the second processor depends on the respective writer field matching the source of the Loop command.

5. The method of claim 1 wherein the WB command is issued on the QWB channel.

6. The method of claim 2 wherein the memory reference request is a request for a shared copy of the selected memory block, and the Loop command is a Loop_Forwarded Read (LFRead) command requesting main memory to send the selected memory block to the second processor.

7. The method of claim 2 wherein the memory reference request is a request for write access to the selected memory block, and the Loop command is a Loop_Forwarded_Read-_Modify (LFReadMod) command requesting main memory to send the selected memory block to the second processor and to grant the second processor write access to the selected memory block.

8. The method of claim 1 wherein
   the computer system has physical interconnect links and buffering resources coupling the processors and main memory, and
   each channel is an independently flow-controlled virtual channel of commands that shares the physical interconnect link and buffering resources.

9. The method of claim 3 wherein the directory is free from maintaining transient states for any memory block.

10. The method of claim 1 wherein the forwarded memory reference request results in a cache miss at the first processor as the selected memory block was victimized from the first processor's cache in response to the WB command.

11. A computer system configured to resolve late race conditions, the computer system comprising:
    a plurality of interconnected processors, each processor having a cache;
    a main memory in communicating relationship with the plurality of processors, the main memory organized into a plurality of memory blocks; and
    a plurality of channels for carrying command packets among the processors and main memory, wherein
    the channels include a Q0 channel for carrying requests for memory blocks, a Q1 channel for carrying probes in response to Q0 requests, a Q2 channel for carrying responses to Q0 requests, and a QWB channel, having a higher priority than the Q1 channel but lower than Q2 channel, for carrying Loop commands from a processor to main memory in response to a forwarded memory reference request received at the processor that specifies a selected memory block that was written back to main memory.

12. The computer system of claim 11 wherein the processor is configured to write the selected memory block back to main memory by issuing a Write_Back (WB) command packet on the QWB channel to main memory, the WB command including a copy of the modified version of the selected memory block.

13. The computer system of claim 12 wherein each channel is implemented as an ordered channel.

14. The computer system of claim 13 further comprising physical interconnect links and buffering resources coupling the processors and main memory, wherein each channel is an independently flow-controlled virtual channel of commands that shares the physical interconnect link and buffering resources.

15. The computer system of claim 12 further comprising at least one directory for maintaining status information regarding the memory blocks of main memory, the directory having, for each memory block, an owner field specifying the owner of the respective memory block, a sharer list specifying zero, one or more processors that have a shared copy of the respective memory block, and a writer field specifying the last owner processor to write the respective memory block back to main memory, wherein, in response to the WB command, an identifier (ID) assigned to the first processor is entered in the writer field of the directory entry for the selected memory block.

16. In a computer system having a plurality of processors and a main memory organized into a plurality of memory blocks, the processors having one or more caches, a method for resolving a late race condition between a first processor and a second processor for a selected memory block, the method comprising:

defining a plurality of channels within the computer system for exchanging command packets among the processors and main memory, the channels including a Q0 channel for carrying requests for memory blocks, a Q1 channel, having a higher priority than the Q0 channel, for carrying probes in response to Q0 requests, a Q2 channel, having a higher priority than the Q1 channel, for carrying responses to Q0 requests, and QWB channel having a higher priority than the Q1 channel but lower than Q2 channel;

issuing a Write_Back (WB) command from the first processor, the WB command including a modified version of the selected memory block taken from the first processor's cache;

forwarding to the first processor a memory reference request specifying the selected memory block, the memory reference request initiated by the second processor;

in response to the memory reference request, issuing a Loop command from the first processor on the QWB channel;

in response to the WB command, writing the modified data back to main memory; and in response to the Loop command, issuing a memory reference response to the second processor.

17. The method of claim 16 wherein the computer system further includes a directory, and the WB command and Loop command are received at the directory.

18. The method of claim 17 wherein the memory reference request and the Loop command are issued from the directory.

19. The method of claim 16 wherein at least part of the directory is located in the main memory of the computer system.

20. The method of claim 16 wherein the WB command is issued on the QWB channel.

* * * * *

UNITED STATES PATENT AND TRADEMARK OFFICE
CERTIFICATE OF CORRECTION

PATENT NO.         : 7,000,080 B2                                       Page 1 of 1
APPLICATION NO. : 10/263836
DATED              : February 14, 2006
INVENTOR(S)        : Stephen R. Van Doren et al.

It is certified that error appears in the above-identified patent and that said Letters Patent is hereby corrected as shown below:

In column 1, line 40, delete "modem" and insert -- modern --, therefor.

In column 17, line 50, after "10/263,741," insert -- filed October 3, 2002 --.

In column 26, line 5, in Claim 6, delete "Loop_Forwarded Read" and insert -- Loop_Forwarded_Read --, therefor.

Signed and Sealed this

Second Day of June, 2009

JOHN DOLL
*Acting Director of the United States Patent and Trademark Office*